(12) United States Patent
Michael et al.

(10) Patent No.: US 10,181,918 B2
(45) Date of Patent: Jan. 15, 2019

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventors: Lachlan Bruce Michael, Saitama (JP); Takuya Okamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/314,142

(22) PCT Filed: Jun. 26, 2015

(86) PCT No.: PCT/JP2015/068449
§ 371 (c)(1),
(2) Date: Nov. 28, 2016

(87) PCT Pub. No.: WO2016/006472
PCT Pub. Date: Jan. 14, 2016

(65) Prior Publication Data
US 2017/0201337 A1 Jul. 13, 2017

(30) Foreign Application Priority Data
Jul. 8, 2014 (JP) .................. 2014-140695

(51) Int. Cl.
*H04H 20/59* (2008.01)
*H04N 21/434* (2011.01)
(Continued)

(52) U.S. Cl.
CPC ........ *H04H 20/59* (2013.01); *H04N 21/4343* (2013.01); *H04N 21/4345* (2013.01);
(Continued)

(58) Field of Classification Search
CPC ............. H04N 21/814; H04N 21/4882; H04N 21/6405; H04N 21/6112; H04N 21/4348;
(Continued)

(56) References Cited

U.S. PATENT DOCUMENTS

2008/0120639 A1* 5/2008 Walter ................. G08B 27/005
725/33
2010/0158047 A1 6/2010 Lee et al.
(Continued)

FOREIGN PATENT DOCUMENTS

| JP | 2007-251298 A | 9/2007 |
|---|---|---|
| JP | 2008-148230 A | 6/2008 |
| WO | WO 2015/026625 A1 | 2/2015 |

OTHER PUBLICATIONS

"Digital Video Broadcasting (DVB); Frame structure channel coding and modulation for a second generation digital terrestrig television broadcasting system (DVB-T2)", ETSI EN 302 755, V1.1.1, Sep. 2009 pages 1-167.
(Continued)

*Primary Examiner* — Nathan J Flynn
*Assistant Examiner* — Cynthia M Fogg
(74) *Attorney, Agent, or Firm* — Oblon, McClelland, Maier & Neustadt, L.L.P.

(57) ABSTRACT

The present technology relates to a transmission device, a transmission method, a reception device, and a reception method that realize a process related to emergency warning information in DVB-T2 standard more promptly at a low power consumption. There is provided a transmission device including an emergency warning information acquisition unit configured to acquire emergency warning information, a content acquisition unit configured to acquire content, a transmission frame generation unit configured to generate a T2 frame including emergency warning notification information indicating that emergency warning information is being transmitted in P1 signaling or L1-pre signaling as a T2 frame, according to DVB-T2 standard, composed of a P1 symbol including P1 signaling, a P2 symbol including L1-pre signaling, and a symbol of data, and a transmission unit configured to transmit the T2 frame as a digital broadcast signal. The present technology can be applied to a transmitter that is capable of transmitting the digital broadcast signal according to the DVB-T2 standard for example.

13 Claims, 22 Drawing Sheets

(51) Int. Cl.
  *H04N 21/61* (2011.01)
  *H04N 21/81* (2011.01)
(52) U.S. Cl.
  CPC ..... *H04N 21/4348* (2013.01); *H04N 21/6112* (2013.01); *H04N 21/814* (2013.01); *Y02D 70/00* (2018.01); *Y02D 70/122* (2018.01); *Y02D 70/168* (2018.01)
(58) Field of Classification Search
  CPC ......... H04N 21/2381; H04N 21/64315; H04H 20/59
  USPC .......................................................... 725/33
  See application file for complete search history.

(56) References Cited

U.S. PATENT DOCUMENTS

| | | | |
|---|---|---|---|
| 2011/0167464 A1 | 7/2011 | Yun et al. | |
| 2015/0058908 A1* | 2/2015 | Ko | H04N 21/6112 725/116 |
| 2015/0071153 A1* | 3/2015 | Hong | H04W 4/22 370/311 |
| 2016/0094895 A1* | 3/2016 | Stadelmeier | H04H 20/59 725/33 |

OTHER PUBLICATIONS

International Search Report dated Sep. 15, 2015 in PCT/JP2015/068449 filed Jun. 26, 2015.
"Digital Video Broadcasting (DVB); Frame structure channel coding and modulation for a second generation digital terrestrial television broadcasting system (DVB-T2)", Final draft ETSI EN 302 755, V1.3.1, Nov. 2011, 9 pages.
Extended European Search Report dated Nov. 28, 2017 in corresponding European Patent Application No. 15819337.5 citing documents AA, AB, AC and AD therein, 6 pages.
"ATSC Mobile DTV Standard: A/153 Part 10, Mobile Emergency Alert System (A/153 Part 10:2013)", XP055178642, Mar. 11, 2013, Retrieved from the Internet: URL:http://www.atsc.org/cms/standards/aI53/AI53-Part-10-2013.pdf [retrieved on Mar. 23, 2015], pp. 1-20.
DVB Organization: "CM1462 Comments-on-new-DVB-T2-activities. pdf", DVB, Digital Video Broadcasting, Jan. 27, 2014, XP017841348, 7 pages.
"Digital Video Broadcasting (DVB); Frame structure channel coding and modulation for a second generation digital terrestrial television broadcasting system (DVB-T2)", ETSI EN 302 755, V1.1.1, Sep. 2009, pp. 1-167.

* cited by examiner

*FIG. 7*

```
for i=0..NUM_AUX-1{
   AUX_STREAM_TYPE                    (4 bits)
   AUX_PRIVATE_CONF                  (28 bits)
}
```

FIG. 10

| S1 | Preamble Format/ P2 Type | Description |
|---|---|---|
| 000 | T2_SISO | The preamble is a T2-base preamble and the P2 part is transmitted in its SISO format |
| 001 | T2_MISO | The preamble is a T2-base preamble and the P2 part is transmitted in its MISO format |
| 010 | Non-T2 | See table 19(b) |
| 011 | T2_LITE_SISO | The preamble is a preamble of a T2-Lite signal (see annex I). The P2 part is transmitted in its SISO format |
| 100 | T2_LITE_MISO | The preamble is a preamble of a T2-Lite signal (see annex I). The P2 part is transmitted in its MISO format |
| 101 110 111 | Reserved for future use | These combinations may be used for future systems, including a system containing both T2-frames and FEF parts, as well as future systems not defined in the present document |

FIG. 11

| S2 field 1 | S2 field 2 | Meaning | Description |
|---|---|---|---|
| 000 | x | Undefined FEF part | The preamble is the preamble of a FEF part, but the contents of the remainder of the FEF part are not specified by the present document—it may be used in any way for professional applications and is not intended for consumer receivers |
| 001-111 | x | Reserved for future use | — |

FIG. 12

| S1 | Preamble Format/ P2 Type | Description |
|---|---|---|
| 000 | T2_SISO | The preamble is a T2-base preamble and the P2 part is transmitted in its SISO format |
| 001 | T2_MISO | The preamble is a T2-base preamble and the P2 part is transmitted in its MISO format |
| 010 | Non-T2 | See table 19(b) |
| 011 | T2_LITE_SISO | The preamble is a preamble of a T2-Lite signal (see annex I). The P2 part is transmitted in its SISO format |
| 100 | T2_LITE_MISO | The preamble is a preamble of a T2-Lite signal (see annex I). The P2 part is transmitted in its MISO format |
| 101 110 111 | Reserved for future use | These combinations may be used for future systems, including a system containing both T2-frames and FEF parts, as well as future systems not defined in the present document |

FIG. 13

| S2 field 1 | S2 field 2 | Meaning | Description |
|---|---|---|---|
| 000 | x | Undefined FEF part | The preamble is the preamble of a FEF part, but the contents of the remainder of the FEF part are not specified by the present document—it may be used in any way for professional applications and is not intended for consumer receivers |
| 001-111 | x | Reserved for future use | — |

FIG. 14

| S1 | Preamble Format/ P2 Type | Description |
|---|---|---|
| 000 | T2_SISO | The preamble is a preamble of a T2-base signal [i,1] and the P2 part is transmitted in its SISO format |
| 001 | T2_MISO | The preamble is a preamble of a T2-base signal [i,1] and the P2 part is transmitted in its MISO format |
| 010 | Non-T2 | See table 19(b) in [i,1] |
| 011 | T2_LITE_SISO | The preamble is a preamble of a T2-Lite signal (annex I in [i,1]) and the P2 part is transmitted in its SISO format |
| 100 | T2_LITE_MISO | The preamble is a preamble of a T2-Lite signal (annex I in [i,1]) and the P2 part is transmitted in its MISO format |
| 101 | NGH_SISO | The preamble is a preamble of an NGH signal and the P2 part is transmitted in its SISO format |
| 110 | NGH_MISO | The preamble is a preamble of an NGH signal and the P2 part is transmitted in its MISO format |
| 111 | ESC | General escape code. The current P1 may be followed with an additional symbol providing additional signalling |

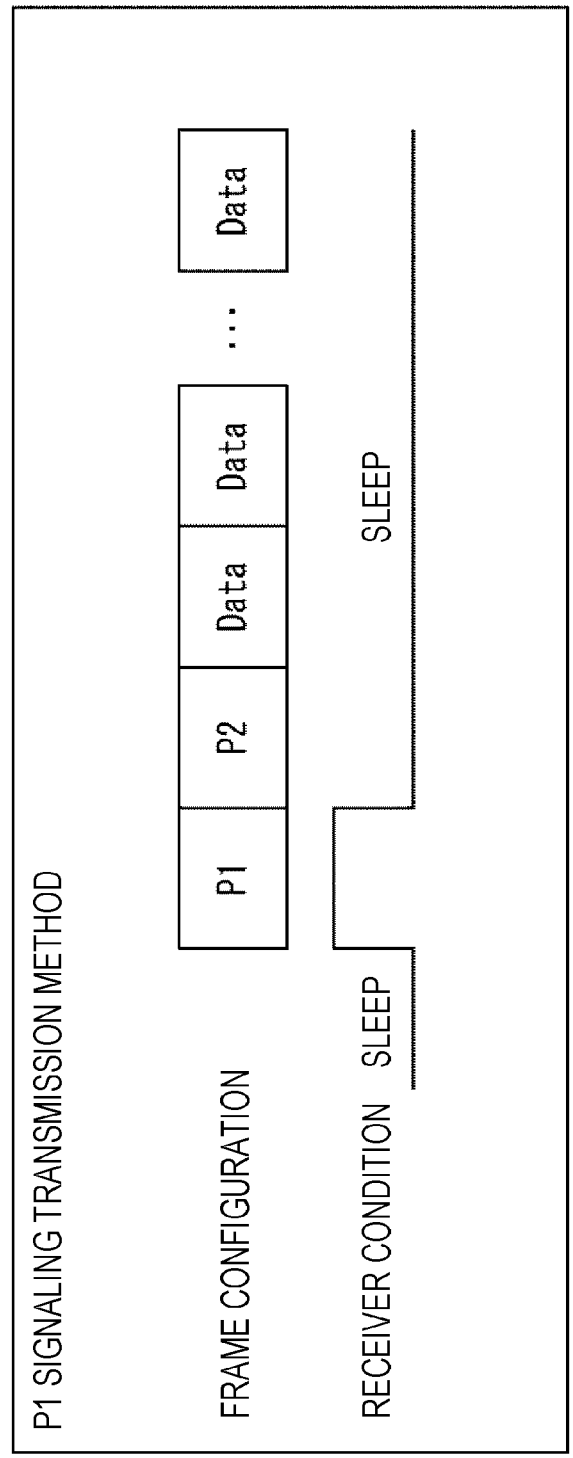

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and is particularly related to a transmission device, a transmission method, a reception device, and a reception method that are capable of executing a process related to emergency warning information in DVB-T2 standard more quickly at a low power consumption.

BACKGROUND ART

Digital video broadcasting-terrestrial (DVB-T) standard has been used as a terrestrial digital broadcasting standard in Europe and all over the world. Further, these days the DVB-T2 standard, which is an improved version of the DVB-T standard, has been in practical use (for example, see Non-Patent Document 1).

Further, an emergency warning system (EWS) has been defined as a method for sending a warning in a case of emergency such as natural disasters or the like including earthquakes and tsunami (for example, see Patent Document 1).

CITATION LIST

Patent Document

Patent Document 1: Japanese Patent Application Laid-Open No. 2008-148230

Non-Patent Document

Non-Patent Document 1: Digital Video Broadcasting (DVB); Frame structure channel coding and modulation for a second generation digital terrestrial television broadcasting system (DVB-T2)

SUMMARY OF THE INVENTION

Problems to be Solved by the Invention

Here, an Emergency Warning System has been also introduced in the DVB standard and there is a demand to execute a process related to emergency alert information more quickly at a low power consumption.

The present technology has been made in view of the above situation and realizes an execution of a process related to emergency warning information in the DVB-T2 standard more quickly at a low power consumption.

Solutions to Problems

A transmission device according to a first aspect of the present technology includes: an emergency warning information acquisition unit configured to acquire emergency warning information; a content acquisition unit configured to acquire a content; a transmission frame generation unit configured to generate a transmission frame that includes emergency warning notification information indicating that the emergency warning information is being transmitted in P1 signaling or L1-pre signaling, as a transmission frame, according to the digital video broadcasting-terrestrial 2 (DVB-T2) standard, composed of a first preamble signal of the P1 signaling, a second preamble signal of the L1-pre signaling, and the content data; and a transmission unit configured to transmit the transmission frame as a digital broadcast signal.

When included in the L1-pre signaling, the emergency warning notification information may be placed in a reserved bit of the L1-pre signaling.

The emergency warning notification information may be a 1-bit emergency warning flag, and the emergency warning information may be transmitted using service information (SI) information, an auxiliary stream, or a particular physical layer pipe (PLP) which are defined in the DVB-T2 standard.

When included in the P1 signaling, the emergency warning notification information may be placed in a reserved bit of the P1 signaling.

The emergency warning notification information may be a particular bit sequence, and the emergency warning information may be transmitted using SI information, an auxiliary stream, or a particular PLP which are defined in the DVB-T2 standard.

A signaling generation unit configured to generate the P1 signaling and the L1-pre signaling may be further included.

The transmission device may be an independent device or an internal block that composes a device.

The transmission method according to a first aspect of the present technology is a transmission method for the transmission device according to the first aspect of the above described present technology.

In the transmission device and transmission method according to the first aspect of the present technology, emergency warning information is acquired, a content is acquired, a transmission frame including emergency warning notification information indicating the emergency warning information is being transmitted in the P1 signaling or the L1-pre signaling, as a transmission frame according to the DVB-T2 standard, composed of a first preamble signal including the P1 signaling, a second preamble signal including the L1-pre signaling, and the content data, and the transmission frame is transmitted as a digital broadcast signal.

A reception device according to a second aspect of the present technology includes: a reception unit configured to receive, as a digital broadcast signal, a transmission frame, according to DVB-T2 standard, composed of a first preamble signal including P1 signaling, a second preamble signal including L1-pre signaling, and content data; and a demodulation unit configured to demodulate the first preamble signal, or the first preamble signal and the second preamble signal and monitor emergency warning notification information indicating that emergency warning information is being transmitted in the P1 signaling included in the first preamble signal or the L1-pre signaling included in the second preamble signal.

When included in the L1-pre signaling, the emergency warning notification information may be placed in a reserved bit of the L1-pre signaling.

The emergency warning notification information may be a 1-bit emergency warning flag, the emergency warning information may be transmitted using SI information, an auxiliary stream, or a particular PLP which are defined by the DVB-T2 standard, and a control unit configured to be activated when the emergency warning notification information indicates that the emergency warning information is being transmitted, and acquire the emergency warning information transmitted using the SI information, the auxiliary stream, or the particular PLP may be further included.

When included in the P1 signaling, the emergency warning notification information may be placed in a reserved bit of the P1 signaling.

The emergency warning notification information may be a particular bit sequence, the emergency warning information may be transmitted using SI information, an auxiliary stream, or a particular PLP, which are defined in the DVB-T2 standard, and a control unit configured to be activated when the emergency warning notification information indicates that the emergency warning information is being transmitted, and acquire the emergency warning information transmitted using the SI information, the auxiliary stream, or the particular PLP may be further included.

The reception device may be an independent device or an internal block that composes a device.

The reception method according to a second aspect of the present technology is a reception method for the reception device according to the second aspect of the above described present technology.

In the reception device and reception method according to the second aspect of the present technology, a transmission frame according to the DVB-T2 standard, which is composed of a first preamble signal including P1 signaling, a second preamble signal including L1-pre signaling, and content data is received as a digital broadcast signal, the first preamble signal, or the first preamble signal and the second preamble signal are demodulated, and emergency warning notification information indicating that emergency warning information is being transmitted is monitored in the P1 signaling included in the first preamble signal or the L1-pre signaling included in the second preamble signal.

Effects of the Invention

According to the first aspect and second aspect of the present technology, a process related to emergency warning information can be executed in the DVB-T2 standard more quickly at a low power consumption.

Here, the above described effects are not always limited and may be any one of the effects described in this disclosure.

BRIEF DESCRIPTION OF DRAWINGS

FIG. 7 is a diagram illustrating a loop of the auxiliary stream included in L1-post signaling.
FIG. 10 is a diagram illustrating a detailed configuration of an S1 field.
FIG. 11 is a diagram illustrating a detailed configuration of an S2 field.
FIG. 12 is a diagram illustrating a detailed configuration of the S1 field.
FIG. 13 is a diagram illustrating a detailed configuration of the S2 field.
FIG. 14 is a diagram illustrating a detailed configuration of the S1 field.
FIG. 15 is a diagram to explain power consumption in a case that a P1 signaling transmission method is employed.

MODE FOR CARRYING OUT THE INVENTION

Hereinafter, embodiments of the present technology will be explained with reference to the drawings. Here, the explanation will be made in the following order.
1. Outline of Emergency Warning System
2. First embodiment (L1-pre signaling transmission method)
3. Second embodiment (P1 signaling transmission method)
4. System configuration
5. Process flow in each device
6. Computer configuration
<1. Outline of Emergency Warning System>

People's lives are exposed to various dangerous events such as natural disasters including earthquakes, tsunami caused by earthquakes, typhoons, heavy rains, stormy winds, tornadoes, floods, and wildfire. When such an event occurs, emergency warning information needs to be informed to people as soon as possible to urge them to evacuate. Emergency warning information in case of a natural disaster is provided by a government agency for example. Further, for the notification of emergency warning information, broadcasting service may be used.

Figure 1:
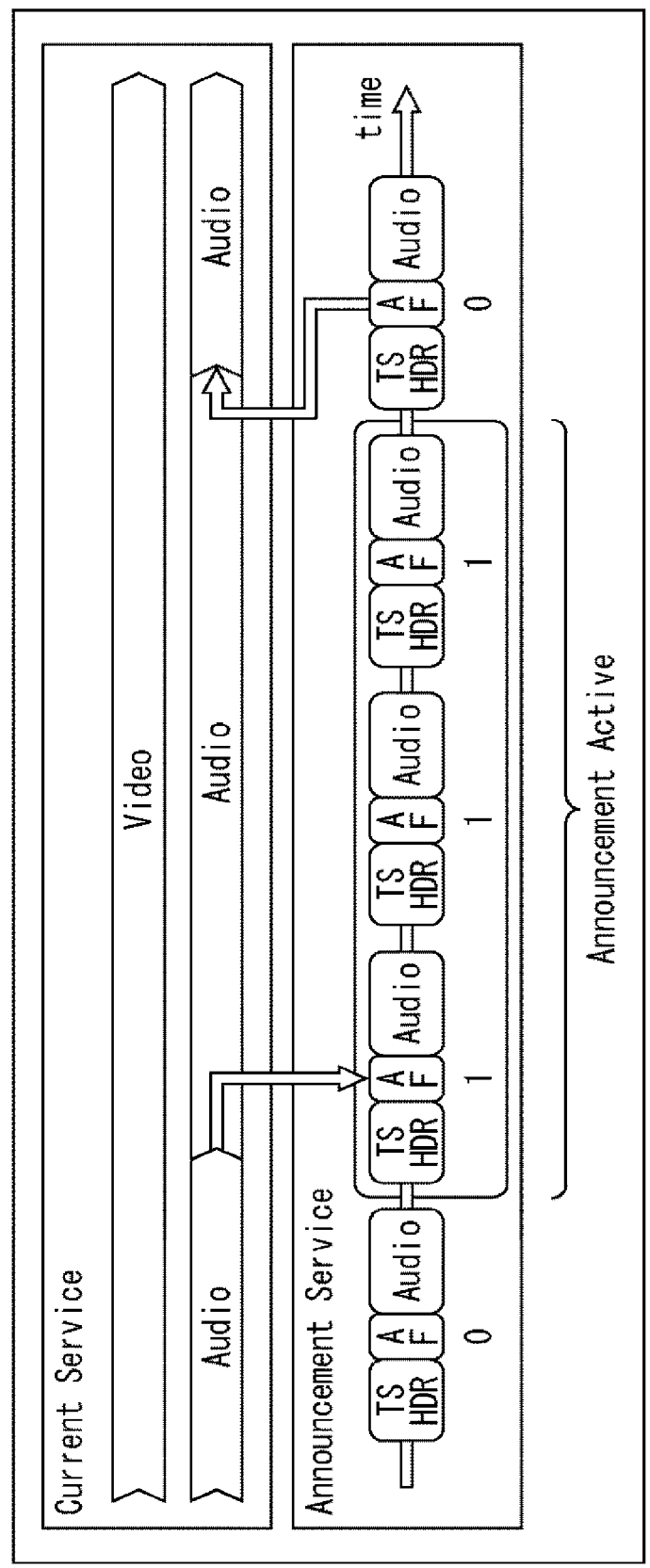
FIG. 1 is a diagram to explain an outline of an Emergency Warning System according to DVB standard.

FIG. 1 is a diagram illustrating an outline of emergency warning system (DVB-EWS) of DVB standard. FIG. 1 schematically illustrates current service and announcement service provided by digital broadcasting according to the DVB standard.

As the current service, video and sound streams, which compose content such as a program, are transmitted by a transmitter. With this, a receiver can output the video and sound of the program. In the announcement service, a transmitter can transmit sound data for example as emergency warning information using service information (SI) information.

Here, in the receiver, an announcement flag (AF) in a TS header (TS HDR) in the announcement service is monitored while video and sound streams of a normal program as a current service are being received. Then, when the announcement flag changes from "0" to "1," the announcement service becomes active and the sound stream of the normal program received by the receiver is switched to sound data of the emergency warning information.

With this, warning in an emergency of a natural disaster such has earthquake and tsunami for example can be given to a user near the receiver. Here, the sound data of the emergency warning information is kept received while the announcement flag is "1," then, is ended when the announcement flag returns to "0," and switched to the sound stream of the normal program.

The Emergency Warning System according to the DVB standard (DVB-EWS) has been performed as described above and, since the SI information is transmitted in an level upper than a physical layer, the receiver cannot obtain the emergency warning information until the signal passes a system on a chip (SoC) which is provided at a later part of a tuner and a demodulator (demodulation unit). Thus, a certain period of time has been needed until analysis of the emergency warning information is completed. Further, since the analysis of the emergency warning information cannot be executed without operating the system on a chip, this increases the power consumption by a corresponding amount. Specifically, since the system on a chip consumes much power, it is preferable to suppress the power consumption as much as possible.

In this manner, in the Emergency Warning System according to the DVB standard, there has been a demand to execute a process related to the emergency alert information more promptly and at a low power consumption. In view of the above, according to the present technology, the following two methods will be proposed to realize an execution of the process related to the emergency warning information according to the DVB-T2 standard more promptly and at a lower power consumption. Here, to distinguish from the two methods of the present technology, the method of the Emergency Warning System according to the DVB standard in FIG. 1 will be referred to as a "DVB-EWS existing method" in the following explanation.

<2. First Embodiment>

In the first embodiment, a method for placing, in the L1-pre signaling, emergency warning notification information indicating that emergency warning information is being transmitted to transmit (hereinafter, referred to as an "L1-pre signaling transmission method") will be explained.

(T2 Frame)

Figure 2:
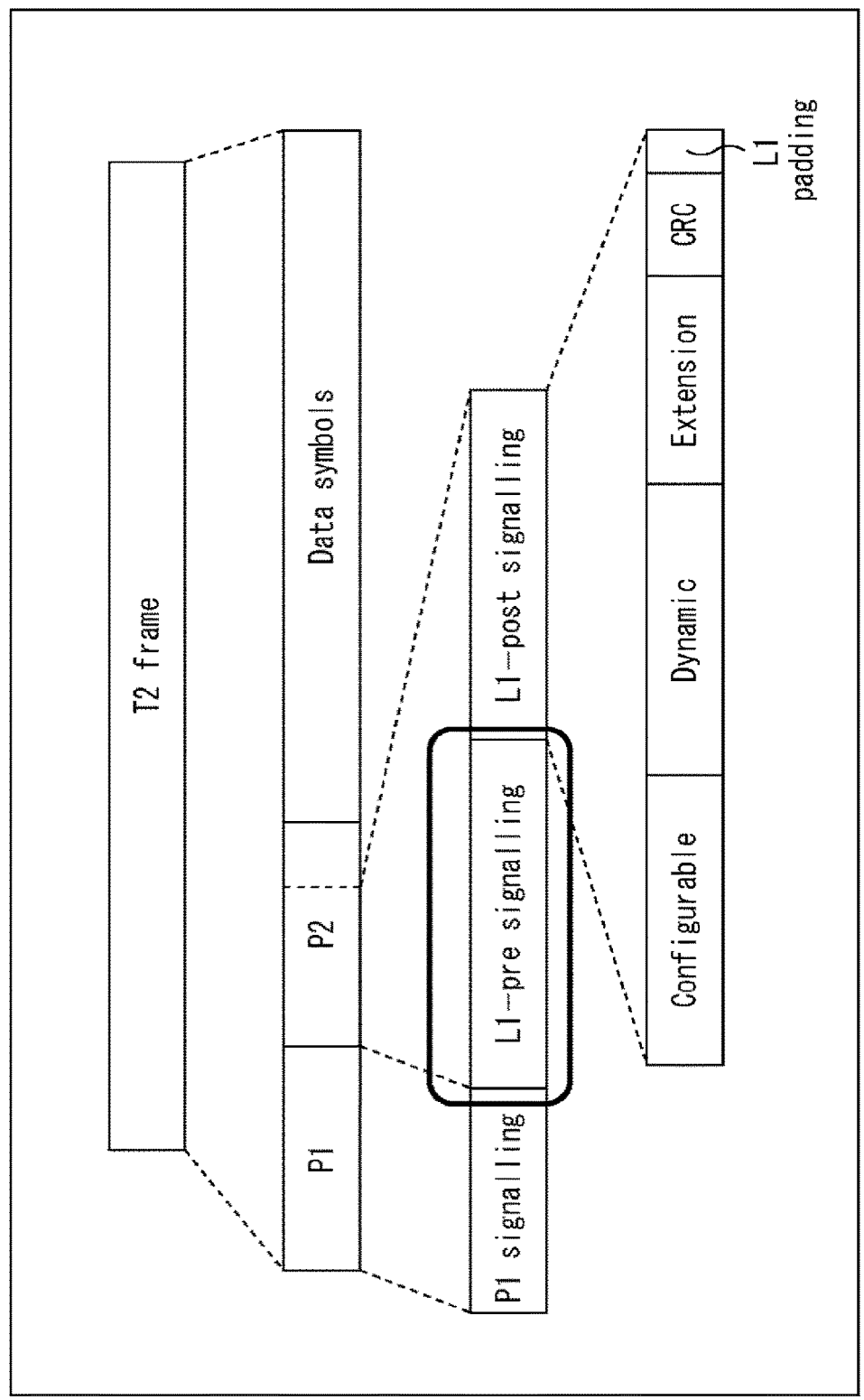
FIG. 2 is a diagram illustrating a format of a T2 frame.

FIG. 2 is a diagram illustrating a format of a T2 frame.

According to the DVB-T2 standard, a frame called T2 frame is defined and data is transmitted in the unit of T2 frames. The T2 frame includes two types of preamble signals called P1 and P2, and the preamble signals include information required in a process such as demodulation of an orthogonal frequency division multiplexing (OFDM) signal.

In the T2 frame, a P1 symbol, a P2 symbol, and data symbols are included in order.

The P1 symbol is a symbol to transmit P1 signalling and, in the P1 signaling, a transmission type and basic transmission parameters are included.

The P2 symbol is a symbol to transmit L1-pre signalling and L1-post signalling. The L1-pre signaling includes information required by the receiver which receives the T2 frame to receive and decode the L1-post signaling. The L1-post signaling includes a parameter required by the receiver to access a physical layer pipes (PLP).

The L1-post signaling is composed of two types of a configurable field and a dynamic field, and an optional extension field is prepared. Further, a cyclic redundancy check (CRC) and L1 padding are placed in order.

Here, according to the DVB-T2 standard, a frame, which is called a future extension frame (FEF), having a structure different from the T2 frame is multiplexed and transmitted in a temporal direction between the T2 frames to be transmitted.

Further, as the T2 frame, there are two types, which are a T2-base frame for a receiver such as a fixed television and a T2-Lite frame for a receiver such as a mobile device, they are classified according to profiles, and the structures of the T2 frames are in common regardless of the types of the profile.

(L1-Pre Signaling)

Figure 3:
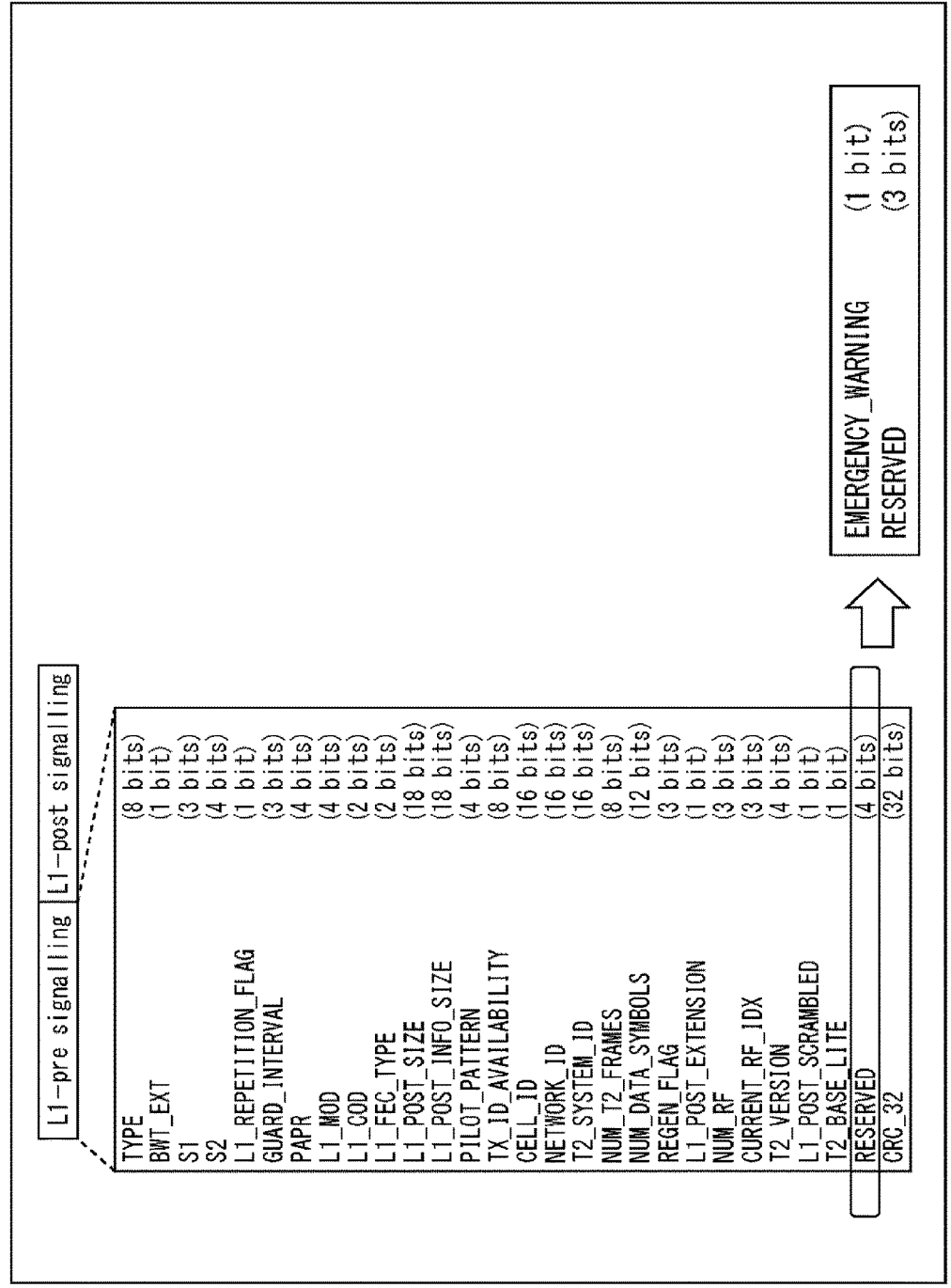
FIG. 3 is a diagram illustrating a detailed configuration of L1-pre signaling.

FIG. 3 is a diagram illustrating a detailed configuration of the L1-pre signaling of FIG. 2.

FIG. 3 illustrates information included in the L1-pre signaling. TYPE is an 8-bit field that defines a type of a stream to be transmitted. BWT_EXT is a 1-bit field that defines whether or not an expansion career mode is used. S1 is a 3-bit field that defines a value same as an S1 field of the P1 signaling. S2 is a 4-bit field that defines a value same as an S2 field of the P1 signaling.

L1_REPETITION_FLAG is a 1-bit field that defines a provision of the dynamic field of the L1-post signaling. GUARD_INTERVAL is a 3-bit field that defines a guard interval. PAPR is a 4-bit field that defines a peak to average power ratio (PAPR). L1_MOD is a 4-bit field that defines a constellation of the L1-post signaling. L1_COD is a 2-bit field that defines a code rate of the L1-post signaling.

L1_FEC_TYPE is a 2-bit field that defines a type of a forward error correction (FEC) of the L1-post signaling. L1_POST_SIZE is an 18-bit field that defines a size of a data block of encoded and modulated L1-post signaling. L1_POST_INFO_SIZE is an 18-bit field that defines a size of a part of information in the data block of the L1-post signaling. PILOT_PATTERN is a 4-bit field that defines a type of a pilot pattern of an OFDM symbol. TX_ID_AVAIL-ABILITY is an 8-bit field that defines an availability of a transmitter ID.

CELL_ID is a 16-bit field that defines a cell ID for identifying a geographical cell in a DVB network. NETWORK_ID is a 16-bit field that defines a network ID for identifying the current DVB network. T2_SYSTEM_ID is a 16-bit field that defines a T2 system ID for identifying a T2 system in the DVB network identified by the network ID.

NUM_T2_FRAMES is an 8-bit field that defines the number of T2 frames of each super frame composed of a T2 frame and an FEF. NUM_DATA_SYMBOLS is a 12-bit field that defines the number of OFDM symbols in each T2 frame. REGEN_FLAG is a 3-bit field that defines the number of regeneration of the signal according to the DVB-T2 standard. L1_POST_EXTENSION is a 1-bit filed that defines an existence of an extension field of the L1-post signaling.

NUM_RF is a 3-bit field that defines a frequency of the current T2 system. CURRENT_RF_IDX is a 3-bit field that defines an index of the current RF channel when time frequency slicing (TFS) is supported. T2 VERSION is a 4-bit field that defines a latest version related to a transmission signal. L1_POST_SCRAMBLED is a 1-bit field that defines whether the L1-post signaling is being scrambled. T2_BASE_LITE is a 1-bit field that defines whether the profile of the current T2-base frame is compatible with the profile of the T2-Lite frame.

RESERVED is a 4-bit field for future expansion. In the L1-pre signaling transmission method, one of the four reserved bits is allocated to emergency warning notification information (an emergency warning flag) that indicates that emergency warning information is being transmitted and other three bits are used as reserved bits. The name of the 1-bit emergency warning flag may be, for example, "EMERGENCY_WARNING"; however, other names may be employed. CRC-32 is a 32-bit field that defines an error-detecting code of the L1-pre signaling.

As described above, in the L1-pre signaling transmission method, since a 1-bit emergency warning flag (emergency warning notification information) is placed in the reserved bit of the L1-pre signaling, the receiver can monitor the emergency warning flag and acquires and output emergency warning information transmitted from the transmitter when the emergency warning flag changes from "0" to "1" for example.

(Comparison Between DVB-EWS Existing Method and L1-Pre Signaling Transmission Method)

Figure 4:
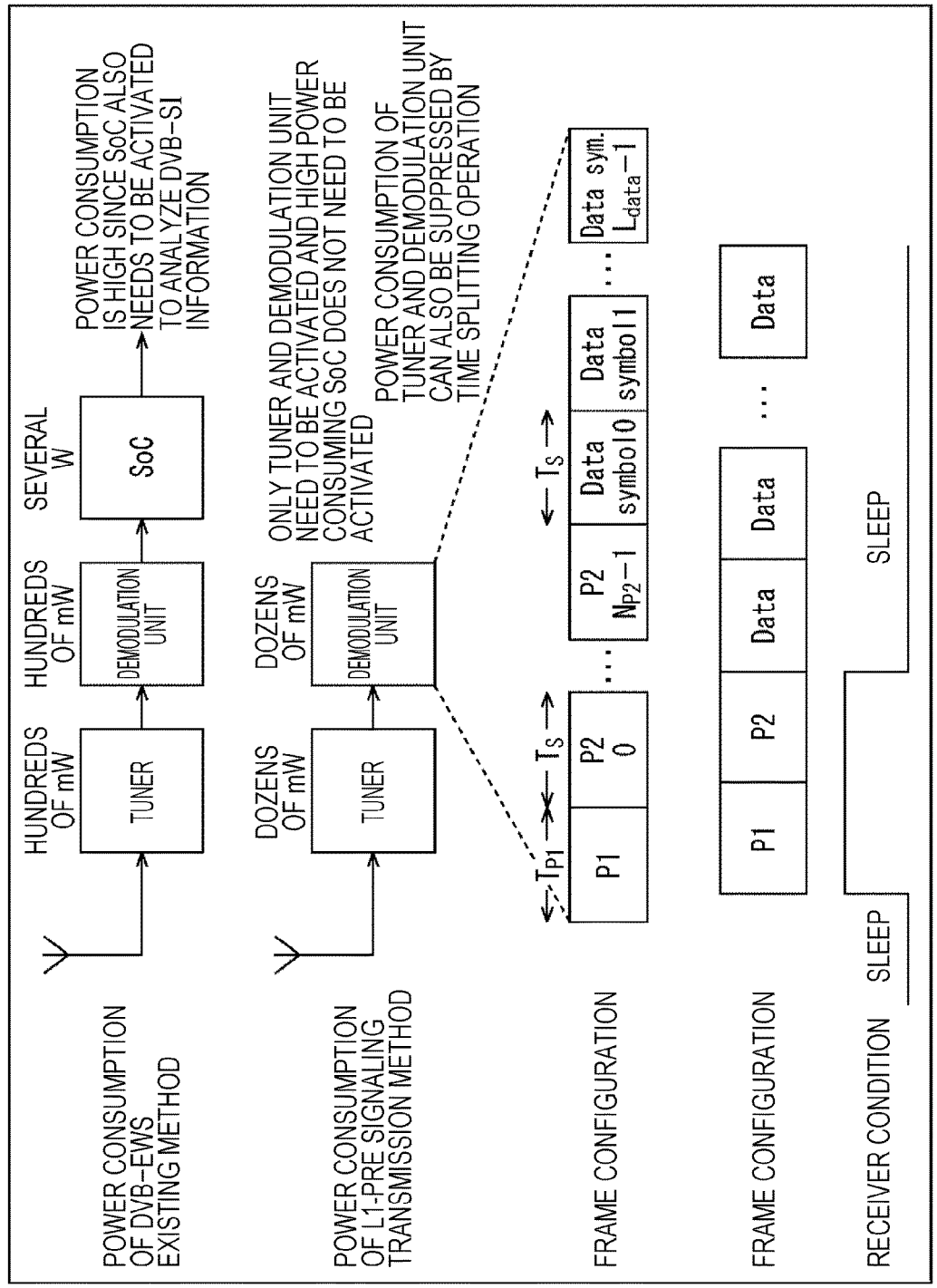
FIG. 4 is a diagram to explain power consumption in a case that an L-pre signaling transmission method is employed.
Figure 5:
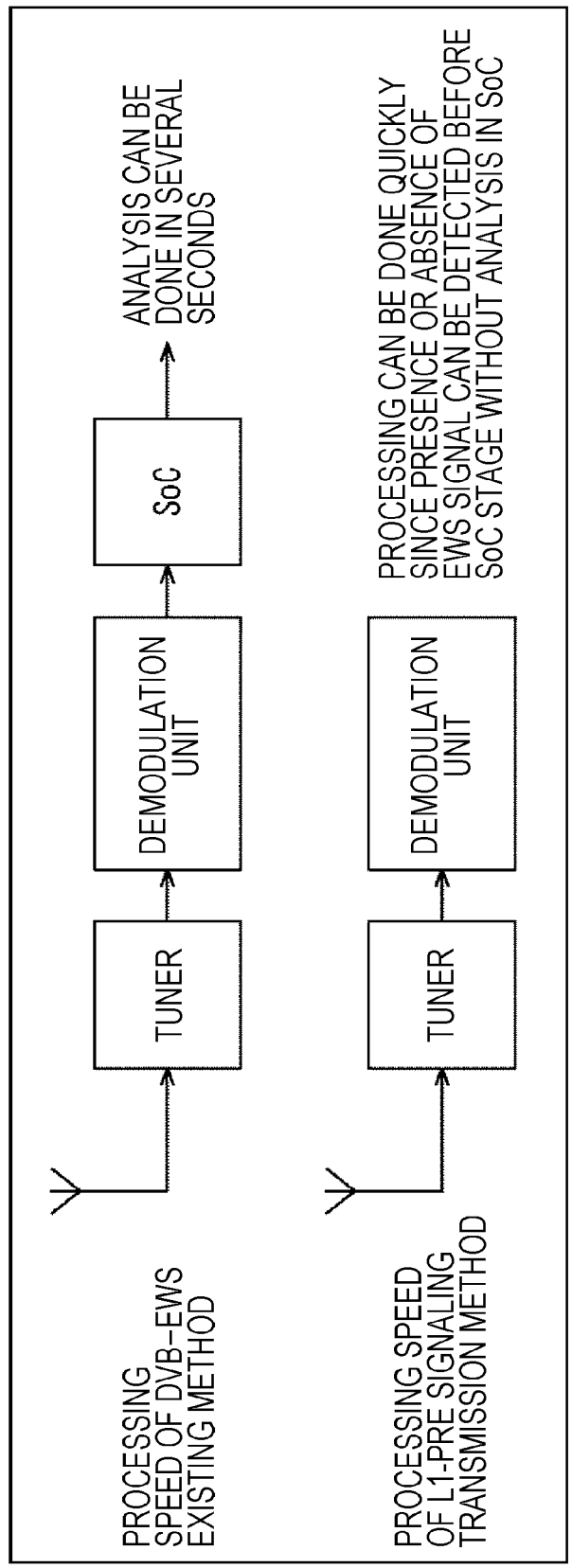
FIG. 5 is a diagram to explain processing speed in a case that the L1-pre signaling transmission method is employed.

Next, with reference to FIGS. 4 and 5, power consumption and processing speed in the DVB-EWS existing method and L1-pre signaling transmission method are compared. Here, the receiver which is capable of receiving a digital broadcasting signal according to the DVB-T2 standard is generally composed of three chips of a tuner, a demodulator (demodulation unit), and a system on a chip (SoC).

In FIG. 4, when the DVB-EWS existing method (FIG. 1) is employed, the receiver cannot monitor (analyze) an announcement flag (AF) until signals are supplied to the system on a chip (SoC) which is provided at a section later than the tuner and demodulation unit. In this case, the receiver consumes hundreds of mW to activate the tuner and demodulation unit respectively and also consumes power of several W to the system on a chip.

On the other hand, when the L1-pre signaling transmission method (FIGS. 2 and 3) is employed, the demodulation unit demodulates P1 and P2 symbols that compose the T2 frame and monitors (analyzes) an emergency warning flag (EMERGENCY_WARNING) placed in the reserved bit of the L1-pre signaling included in the P2 symbol. In this case, since the demodulation unit before the system on a chip (SoC) monitors (analyzes) the emergency warning flag, only power of several dozens of mW is consumed to activate the tuner and demodulation unit, and the system on a chip with a high power consumption does not have to be activated. Here, in this case, the power consumption of the tuner and demodulation unit can be reduced by executing a time splitting operation.

In this manner, to monitor (analyze) the announcement flag (SI information), the system on a chip with a high power consumption needs to be activated in DVB-EWS existing method; however, in the L1-pre signaling transmission method, the system on a chip does not need to be activated to monitor the emergency warning flag placed in the reserved bit of L1-pre signaling and this reduces the power consumption.

With this, since the receiver basically needs to demodulate the P1 symbol to demodulate the P2 symbol, the demodulation unit can monitor (analyze) the emergency warning flag placed in the reserved bit of L1-pre signaling included in the P2 symbol when the P1 and P2 symbols composing the T2 frame are received, and operate in a mode to be in a sleep state (a low power consumption mode) when symbols of other data are received. Then, when the emergency warning flag placed in the reserved bit of the L1-pre signaling included in the P2 symbol indicates that emergency warning information is being transmitted (for example, when "0" changes to "1"), the receiver activates the system on a chip and acquires and outputs the emergency warning information transmitted from the transmitter.

Further, in FIG. 5, when the DVB-EWS existing method (FIG. 1) is employed, the receiver cannot monitor (analyze) the announcement flag (SI information) without activating the system on a chip (SoC), the processing speed to complete the analysis takes a certain period of time such as several seconds, for example.

On the other hand, when the L1-pre signaling transmission method (FIGS. 2 and 3) is employed, in the receiver, since the demodulation unit monitors (analyzes) the emergency warning flag without activating the system on a chip, an analysis process in the system on a chip is not necessary and a monitoring result of the emergency warning flag can be obtained before the system on a chip section. Thus, when the L1-pre signaling transmission method is employed, compared to the case that the DVB-EWS existing method is employed, the process related to the emergency warning information can be promptly executed.

Here, in the L1-pre signaling transmission method, when the emergency warning flag placed in the reserved bit of the L1-pre signaling changes from "0" to "1" for example, the receiver recognizes that the emergency warning information is being transmitted and acquires the emergency warning information by activating the system on a chip, and accordingly the emergency warning flag (emergency warning notification information) can serve as a so-called boot trigger.

(Transmission of Emergency Warning Information)

Here, in the receiver, the demodulation unit monitors the emergency warning flag placed in the reserved bit of the L1-pre signaling and, when the emergency warning flag changes from "0" to "1" for example, the system on a chip is activated and emergency warning information transmitted from the transmitter is acquired and outputted. The emergency warning information can be transmitted by, for example, one of a method using service information (SI) information, a method using an auxiliary stream, and a method using a particular physical layer pipe (PLP).

(A) Method Using SI Information

In the method using the SI information, similarly to the Emergency Warning System (DVB-EWS) according to the DVB standard of FIG. 1, the emergency warning information is transmitted using SI information.

(B) Method Using Auxiliary Stream

Figure 6:
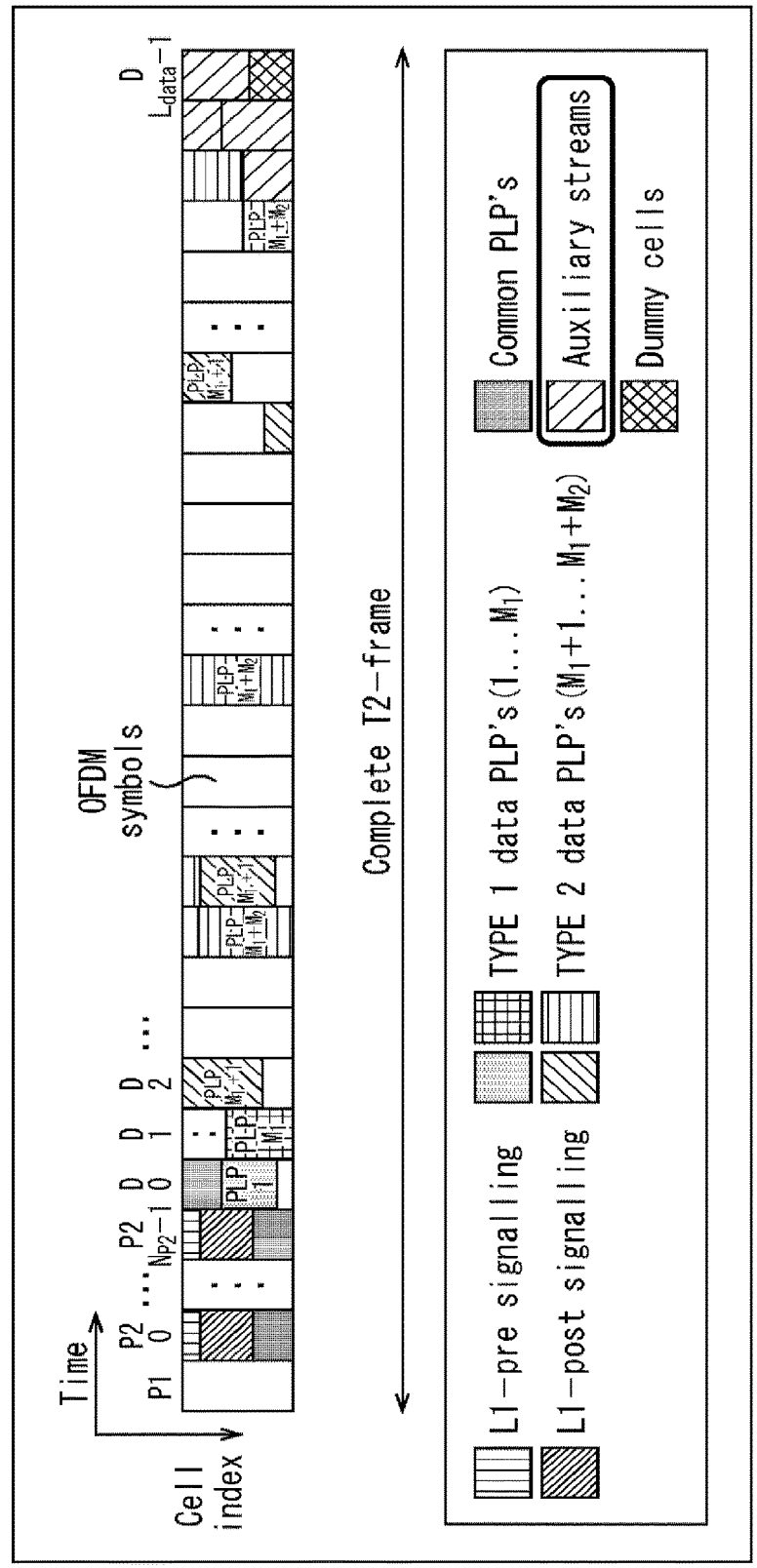
FIG. 6 is a diagram illustrating a transmission method of an auxiliary stream.

In the method using an auxiliary stream, the emergency warning information as bit data is transmitted by an auxiliary stream. In FIG. 6, symbols of auxiliary stream data included in the T2 frame are illustrated in chronological order. In the auxiliary stream, for example, a constant bit rate of about hundreds bits is transmitted and information such as an area, an epicenter, and the like can be informed by using the bit data in a case of emergency warning information of earthquakes and tsunami, for example. For example, in the receiver, by executing a filtering process using information such as the area, epicenter and the like transmitted as the auxiliary stream, it is activated only when the information relates to the place where the receiver is placed to acquire and output emergency warning information transmitted from the transmitter.

FIG. 7 illustrates a part of information included in the L1-post signaling. In FIG. 7, in a loop of the auxiliary stream, AUX_STREAM_TYPE and AUX_PRIVATE_CONF are placed. AUX_STREAM_TYPE is a 4-bit field that defines a type of the auxiliary stream. AUX_PRIVATE_CONF is 28-bit field that defines a modulation method, a code rate or the like of the auxiliary stream.

Figure 8:
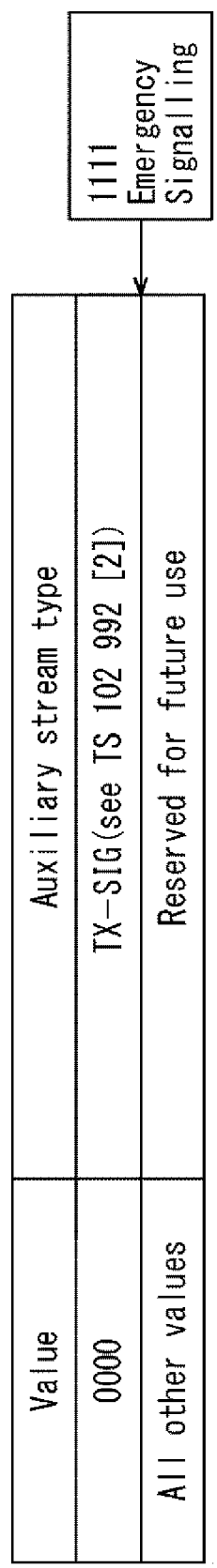
FIG. 8 is a diagram illustrating a configuration example of AUX_STREAM_TYPE.

As illustrated in FIG. 8, when bits of "0000" are set in AUX_STREAM_TYPE, it represents "TX-SIG," that is, an auxiliary stream of transmitter signatures (TX-SIG). Further, in AUX_STREAM_TYPE, bits other than the bits of "0000" all represent "Reserved for future use", that is, reserved bits for future extension. Here, in AUX_STREAM_TYPE, for example, bits of "1111" are allocated to "Emergency signalling". With this, it can be expressed that the emergency warning information is being transmitted by the auxiliary stream.

(C) Method Using Particular PLP

In the method using a particular PLP, emergency warning information is transmitted using a PLP which is different from the PLP for transmitting a stream of video and sound composing content such as a program, for example. In this case, video or sound can be included as the emergency warning information and it becomes able to provide an Emergency Warning System service.

Here, the above described three methods are examples and other methods may be employed. For example, a constant bit data as emergency warning information may be transmitted as a substitute for the information emergency warning flag as the emergency warning notification.

<3. Second Embodiment>

A second embodiment explains a method for placing emergency warning notification information that indicates that emergency warning information is being transmitted in P1 signaling to transmit (hereinafter, referred to as a "P1 signaling transmission method").

(T2 Frame)

Figure 9:
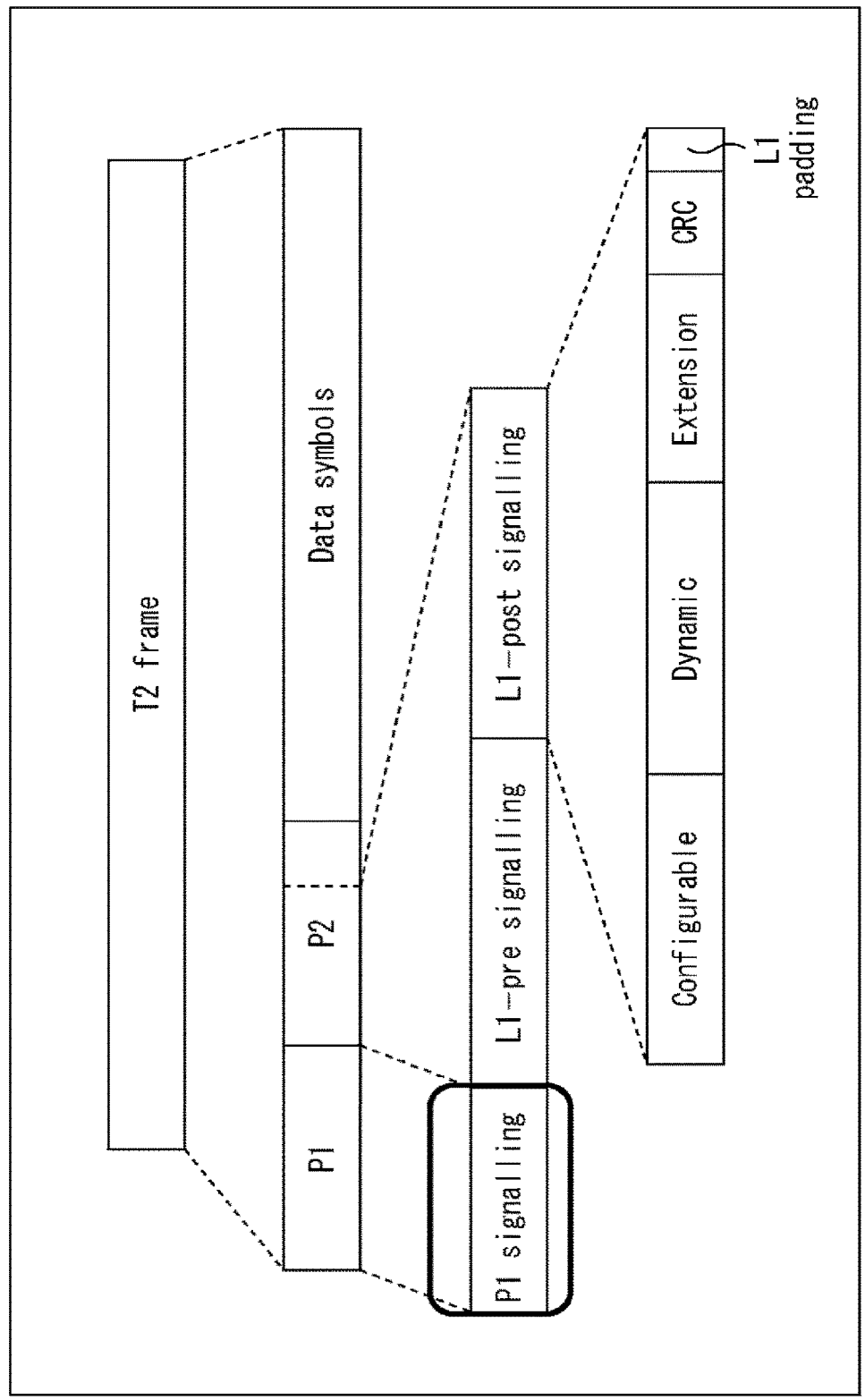
FIG. 9 is a diagram illustrating a format of a T2 frame.

FIG. 9 is a diagram illustrating a format of a T2 frame.

The T2 frame of FIG. 9 is formed similarly to the T2 frame of FIG. 2; however, in the P1 signaling transmission method, emergency warning notification information is placed in a reserved bit of P1 signaling included in a P1 symbol. Here, in the P1 signaling, a transmission type and basic transmission parameters are included.

More specifically, the P1 signaling (P1) includes S1, S2 and the like as parameters. S1 and S2 indicate in which of single input single output (SISO) or multiple input, single output (MISO) P2 is to be transmitted, and a fast frourier transform (FFT) size or the like when FFT calculation of P2 is executed.

(1) Defining Particular Bit Sequence in Reserved Bits in S2 Field

FIG. 10 is a diagram illustrating a detailed configuration of an S1 field. In FIG. 10, the S1 field is composed of three bits.

In the S1 field, when bits of "000" are set, it is indicated that "T2_SISO," which is a preamble signal, is a T2-base preamble signal and SISO is employed as the P2 transmission method. Further, when bits of "001" are set, it is indicated that "T2_MISO," which is a preamble signal, is a T2-base preamble signal and MISO is employed as the P2 transmission method.

Further, in the S1 field, when bits of "010" are set, it is indicated that "Non_T2," which is a preamble signal, is not a T2 preamble signal. Here, when the bits are set as "010" in the S1 field, the S2 field indicates information different from the FFT size or the like of the case that bits of "000," "001," "011," or "100" is set.

In other words, as illustrated in FIG. 11, when the bits of "000" are set in the S2 field 1, it is indicated that it is "Undefined FEF part," which is a preamble signal of an undefined future extension frame (FEF), and has structure different from the T2 frame.

Further, in the S2 field 1, the bits from "001" to "111" all indicate "Reserved for future use," that is, reserved bits for future extension. Among these reserved bits, any particular bit sequence is allocated to emergency warning notification information that indicates that emergency warning information is being transmitted.

Referring back to FIG. 10, when the bits of "011" are set in the S1 field, it indicates "T2_LITE_SISO," which is that the preamble signal is a preamble signal of T2_LITE and that SISO is employed as the P2 transmission method. Further, when the bits of "100" are set, it indicates "T2_LITE_MISO," which is that the preamble signal is a preamble signal of T2_LITE and that MISO is employed as the P2 transmission method.

Here, in the S1 field, the bits of "101," "110," or "111" all indicate "Reserved for future use," that is, reserved bits for future extension.

As described above, in the P1 signaling transmission method, since a particular bit sequence (emergency warning notification information) indicating that the emergency warning information is being transmitted is placed in the reserved bits of the S2 field of the P1 signaling, the receiver monitors the bit sequence set in the S2 field and, when a particular bit sequence (for example, "001," "111," or the like) is detected, the emergency warning information transmitted from the transmitter can be acquired and output.

(2) Defining Particular Bit Sequence in Reserved Bits of S1 Field

FIG. 12 is a diagram illustrating a detailed configuration of an S1 field. In FIG. 12, information set in the S1 field is similar to the information set in the S1 field of FIG. 10. Here, in the S1 field of FIG. 12, one of particular bit sequences (special bit sequence) among the reserved bits of "101," "110," or "111" is allocated to emergency warning notification information that indicates that the emergency warning information is being transmitted.

In this case, since the particular bit sequence (emergency warning notification information) indicating that the emergency warning information is being transmitted is allocated to the reserved bits in the S1 field, as illustrated in FIG. 13, the particular bit sequence indicating that the emergency warning information is being transmitted is not allocated to the reserved bit of the S2 field.

Here, as illustrated in FIG. 14, to the reserved bits of the S1 field, a new parameter is to be allocated according to the digital video broadcasting-next generation handheld (DVB-NGH) standard. In the S1 field of FIG. 14, "NGH_SISO" is allocated to the bits of "101," "NGH_MISO" is allocated to the bits of "110," and "ESC" is allocated to the bits of "111," respectively.

As described above, in the P1 signaling transmission method, since the particular bit sequence (emergency warning notification information) indicating that the emergency warning information is being transmitted is placed in the reserved bits of the S1 field of the P1 signaling, the receiver can monitor the bit sequence set in the S1 field and, when the particular bit sequence (for example, "101," "111," or the like) is detected, the emergency warning information can be acquired and output.

(Comparison Between DVB-EWS Existing Method and P1 Signaling Transmission Method)

Next, with reference to FIG. 15, power consumption and processing speed in the DVB-EWS existing method and P1 signaling transmission method are compared.

Regarding power consumption of the receiver, when the P1 signaling transmission method (FIG. 9 to 13) is employed, the P1 symbol composing the T2 frame is demodulated and the bit sequence set in the reserved bits of the P1 signaling included in the P1 symbol can be monitored (analyzed). In other words, in this case, since the bit sequence is monitored in the demodulation unit which is a section before the system on a chip (SoC), similarly to the above described L1-pre signaling transmission method, only the power to activate the tuner and demodulation unit is consumed and the high power consuming system on a chip does not need to be activated.

In other words, in the DVB-EWS existing method (FIG. 1), the high power consuming system on a chip needs to be activated to monitor the announcement flag (SI information); however, in the P1 signaling transmission method, the system on a chip does not need to be activated to monitor the bit sequence set in the S1 field or S2 field and the power consumption can be suppressed.

With this, as illustrated in FIG. 15, the receiver can monitor (analyze) the bit sequence set, by the demodulation unit, in the reserved bits of the P1 signaling only when receiving the P1 symbol composing the T2 frame, and operates in a mode in a sleep state (a low power consumption mode) when receiving other P2 and data symbols. Then, when a particular bit sequence (for example, "101," "111," or the like) is detected as the bit sequence in the reserved bit of the P1 signaling of the P1 symbol, the receiver activates the system on a chip so that the emergency warning information transmitted from the transmitter is acquired and output.

Further, when the P1 signaling transmission method (FIG. 9 to 13) is employed, in the receiver, since the demodulation unit monitors (analyzes) the bit sequence without activating the system on a chip, an analyzing process in the system on a chip is not needed and a particular bit sequence monitoring result can be obtained in a stage prior to the system on a chip. Thus, when the P1 signaling transmission method is employed, the process related to the emergency warning information can be done promptly, compared to the case that the DVB-EWS existing method (FIG. 1) is employed. Here, in the P1 signaling transmission method, since the P2 symbol is not needed to be demodulated to demodulate the P1 symbol, the power consumption can be suppressed and the processing speed is further improved, compared to the L1-pre signaling transmission method in which both of the P1 and P2 symbols needed to be demodulated.

Here, in the P1 signaling transmission method, when a particular bit sequence is set in the reserved bits of the P1 signaling, since the receiver recognizes that the emergency warning information is being transmitted and the system on a chip is activated to acquire emergency warning information, the particular bit sequence (emergency warning notification information) can serve as so-called boot trigger information.

(Transmission of Emergency Warning Information)

Here, in the receiver, the demodulation unit monitors the bit sequence placed in the reserved bits of the P1 signaling and, when a particular bit sequence is detected, the system on a chip is activated and the emergency warning information transmitted from the transmitter is acquired and output. Similarly to the L1-pre signaling transmission method, the emergency warning information can be transmitted by one of (A) method using SI information, (B) method using auxiliary stream, and (C) method using particular PLP, for example.

Figure 16:
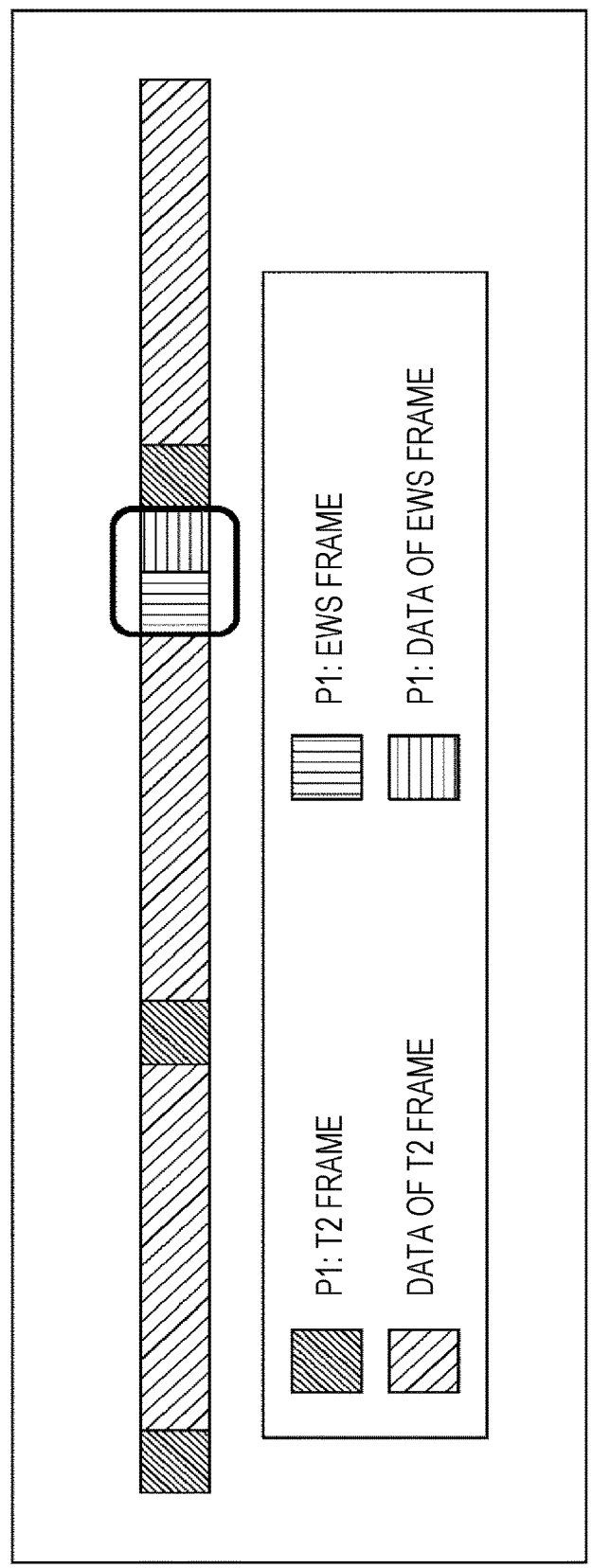
FIG. 16 is a diagram to explain a transmission using a particular PLP.

Here, as illustrated in FIG. 16, when a stream of video and sound of a normal program is transmitted, P1 of the T2 frame and data are repeatedly transmitted; however, in a case that (C) method using particular PLP is employed, when the emergency warning notification information in which P1 (P1 signaling) is placed, since the data can be placed thereafter, the flexibility of data design of the transmission frames can be improved.

<4. System Configuration>

(Configuration Example of Emergency Warning Information Transmission System)

Figure 17:
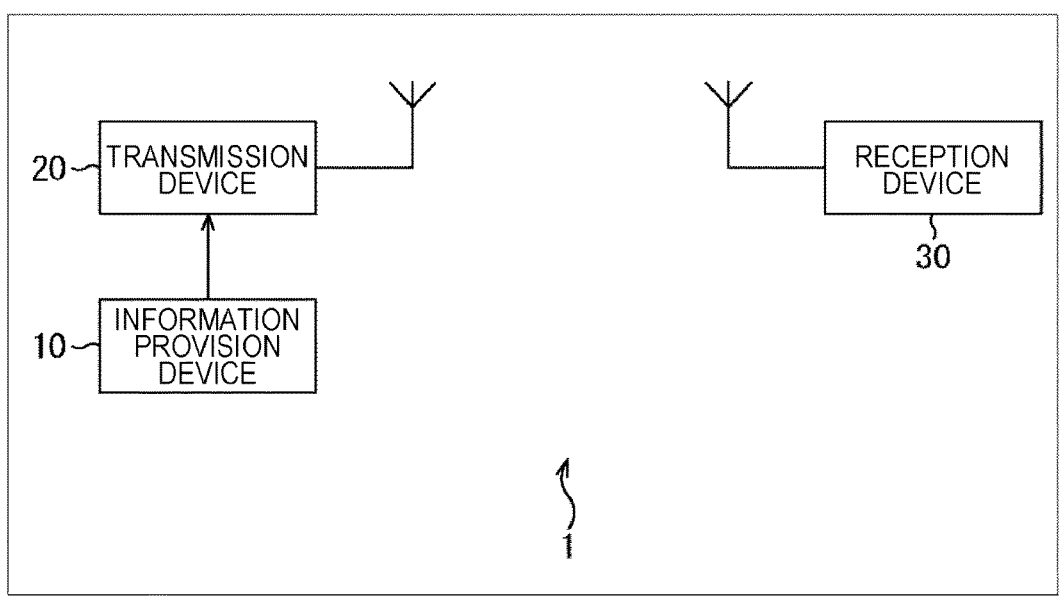
FIG. 17 is a diagram to explain a configuration example of an emergency warning information transmission system to which the present technology is applied.

FIG. 17 is a diagram illustrating an example of a configuration of an emergency warning information transmission system to which the present technology is applied.

Here, the system represents an assembly of a plurality of components (devices or the like).

An emergency warning information transmission system 1 is composed of an information provision device 10, a transmission device 20, and a reception device 30.

The information provision device 10 is managed by Meteorological Agency or other government agencies for example, generates emergency warning information to notify an occurrence of various emergency situations such as natural disasters like earthquakes or tsunami caused by earthquakes, typhoons or heavy rains, stormy winds, tornadoes, floods, wildfire, and provides the information to the transmission device 20. Here, the information provision device 10 and the transmission device 20 are connected via an arbitrary communication path such as the Internet, a dedicated line, or the like.

The transmission device 20 corresponds to the above described transmitter and is managed by a broadcasting station that provides terrestrial digital broadcast service, for example. The transmission device 20 transmits content such as a program using digital broadcast signals. Further, when emergency warning information is provided from the information provision device 10, the transmission device 20 transmits by including emergency warning information and emergency warning notification information in digital broadcast signals.

The reception device 30 corresponds to the above described receiver, is composed of a television, a set-top box, or the like for example, and is placed at individual homes or the like. The reception device 30 receives digital broadcast signals transmitted from the transmission device and outputs video or sound of content of a program or the like.

Further, when emergency warning notification information included in the digital broadcast signals indicates that the emergency warning information is being transmitted, the reception device 30 acquires the emergency warning information included in the digital broadcast signals to output a warning sound or displays a warning message on a screen for example. With this, a warning alert can be instantly notified to a user.

Here, in the emergency warning information transmission system 1 of FIG. 17, the transmission device 20 is made to receive provision of emergency warning information from the information provision device 10 which is managed by a government agency; however, the transmission device 20 may acquire emergency warning information from an information source other than the information provision device 10. Further, the information provision device 10 does not always have to be managed by a government agency and may be managed by a private organization or a broadcasting station itself.

Further, in the emergency warning information transmission system 1 of FIG. 17, only one transmission device is illustrated; however, a plurality of transmission devices are provided in each broadcasting station in actual. Further, in FIG. 17, only one reception device 30 is illustrated; however, a plurality of reception devices 30 are provided in actual.

(Configuration Example of Transmission Device)

Figure 18:
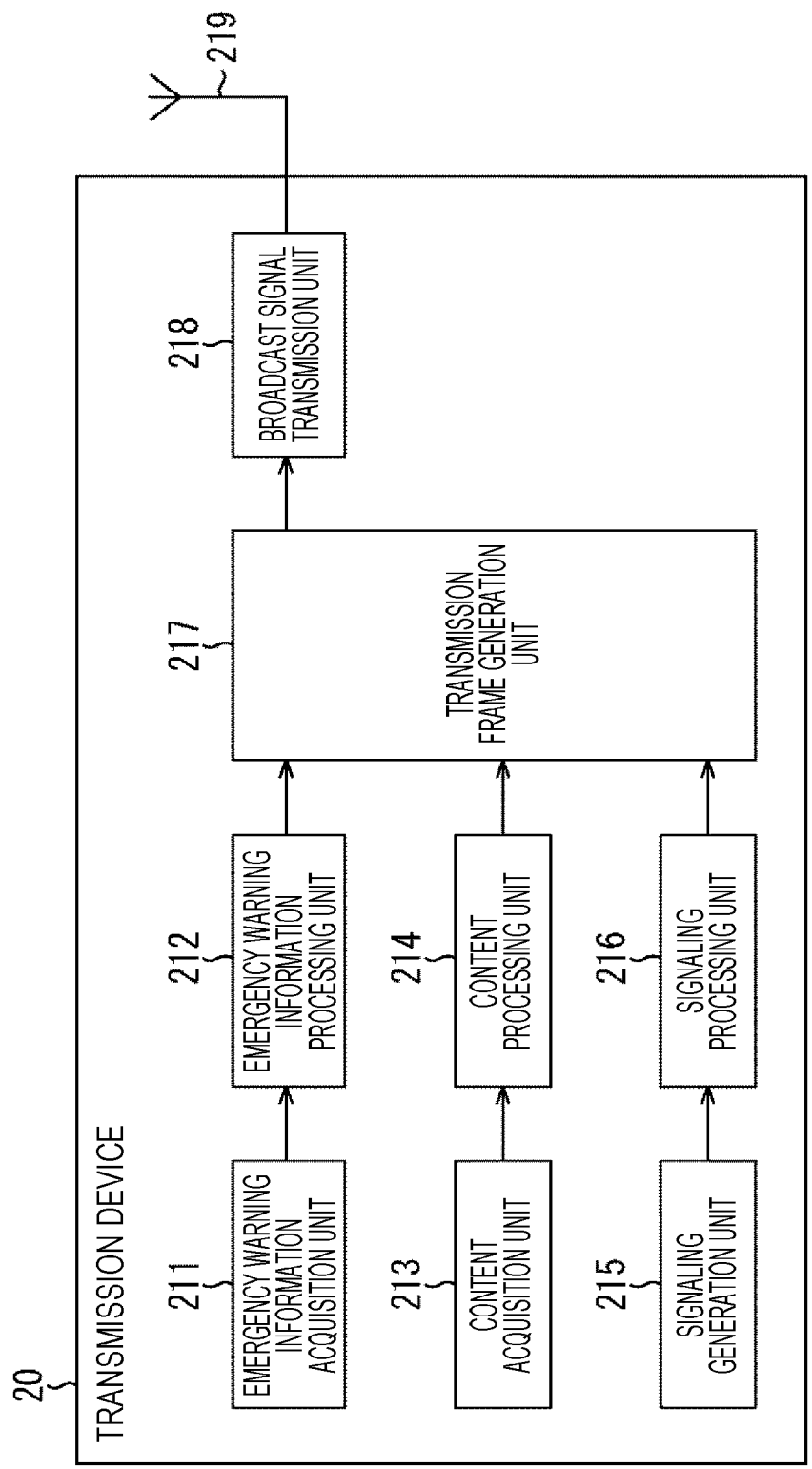
FIG. 18 is a diagram illustrating a configuration example of a transmission device.

FIG. 18 is a diagram illustrating an example of a configuration of the transmission device 20 of FIG. 17.

In FIG. 18, the transmission device 20 includes an emergency warning information acquisition unit 211, an emergency warning information processing unit 212, a content acquisition unit 213, a content processing unit 214, a signaling generation unit 215, a signaling processing unit 216, a transmission frame generation unit 217, and a broadcast signal transmission unit 218.

When emergency warning information is provided from the information provision device 10 via an arbitrary communication path, the emergency warning information is acquired by the emergency warning information acquisition unit 211 and provided to the emergency warning information processing unit 212. The emergency warning information provided from the emergency warning information acquisition unit 211 is processed by the emergency warning information processing unit 212 and supplied to the transmission frame generation unit 217.

Here, in the emergency warning information processing unit 212, a filtering process for removing unnecessary information (for example, information which is not related to the broadcasting area) or a file format converting process or the like is performed on the emergency warning information, for example.

The content acquisition unit 213 acquires content of a program or the like and provides the contents to the content processing unit 214. The content processing unit 214 processes the contents supplied from the content acquisition unit 213 and provides the contents to the transmission frame generation unit 217.

Here, as the content, for example, corresponding contents according to a broadcasting time period from a storage area of already recorded contents, or live contents from a studio or on location is acquired. Further, in the content processing unit 214, encoding or format type conversion processing or the like on the contents, for example are executed.

The signaling generation unit 215 generates signaling and supplies the signaling to signaling processing unit 216. The signaling processing unit 216 processes signaling from the signaling generation unit 215 and supplies the signaling to the transmission frame generation unit 217.

Here, as the signaling, for example, P1 signalling, L1 pre-signalling, and L1 post-signalling according to the DVB-T2 standard are generated. Further, when emergency warning information is provided from the information provision device via any communication path, the signaling processing unit 216 includes emergency warning notification information indicating that emergency warning information is being transmitted to the P1 signaling or L1-pre signaling.

More specifically, when the above described L1-pre signaling transmission method (FIGS. 2 and 3) is employed, since a 1-bit emergency warning flag indicating that emergency warning information is being transmitted is allocated to a reserved bit of the L1-pre signaling, the emergency warning flag is made to be "1." Further, when the above described P1 signaling transmission method (FIG. 9 to 13) is employed, since a particular bit sequence indicating that emergency warning information is being transmitted is allocated to the reserved bit of the S1 field or S2 field of the P1 signaling, the particular bit sequence is made to be set.

When emergency warning information is not provided from the information provision device 10, a transmission frame such as a T2 frame according to the DVB-T2 standard is generated by the transmission frame generation unit 217 on the basis of contents data from the content processing unit 214 and signaling data from the signaling processing unit 216 and supplied to the broadcast signal transmission unit 218.

Further, when the emergency warning information has been provided from the information provision device 10, a transmission frame such as a T2 frame according to the DVB-T2 standard by the transmission frame generation unit 217 on the basis of the emergency warning information from the emergency warning information processing unit 212, contents data from the content processing unit 214, and signaling data from the signaling processing unit 216 and supplied to the broadcast signal transmission unit 218.

Here, in this case, in the P1 signaling or the L1-pre signaling, emergency warning notification information indicating that the emergency warning information is being transmitted is included. Further, as described above, the emergency warning information can be transmitted by, for example, any one of (A) method using SI information, (B) method using auxiliary stream, and (C) method using particular PLP.

The broadcast signal transmission unit 218 executes, for example, coding, digital modulation such as orthogonal frequency division multiplexing (OFDM), upconversion to a radio frequency (RF) band (frequency channel allocated to the broadcasting station), or power amplification on the transmission frame from the transmission frame generation unit 217 and transmits the frame as a digital broadcast signal via an antenna 219.

Here, in the transmission device 20 of FIG. 18, it is not required to provide all the function blocks physically in a single device, and at least a part of the function blocks may be provided as a device which is physically independent from other function blocks. For example, the emergency warning information processing unit 212 may be provided in a server in the Internet.

(Configuration Example of Reception Device)

Figure 19:
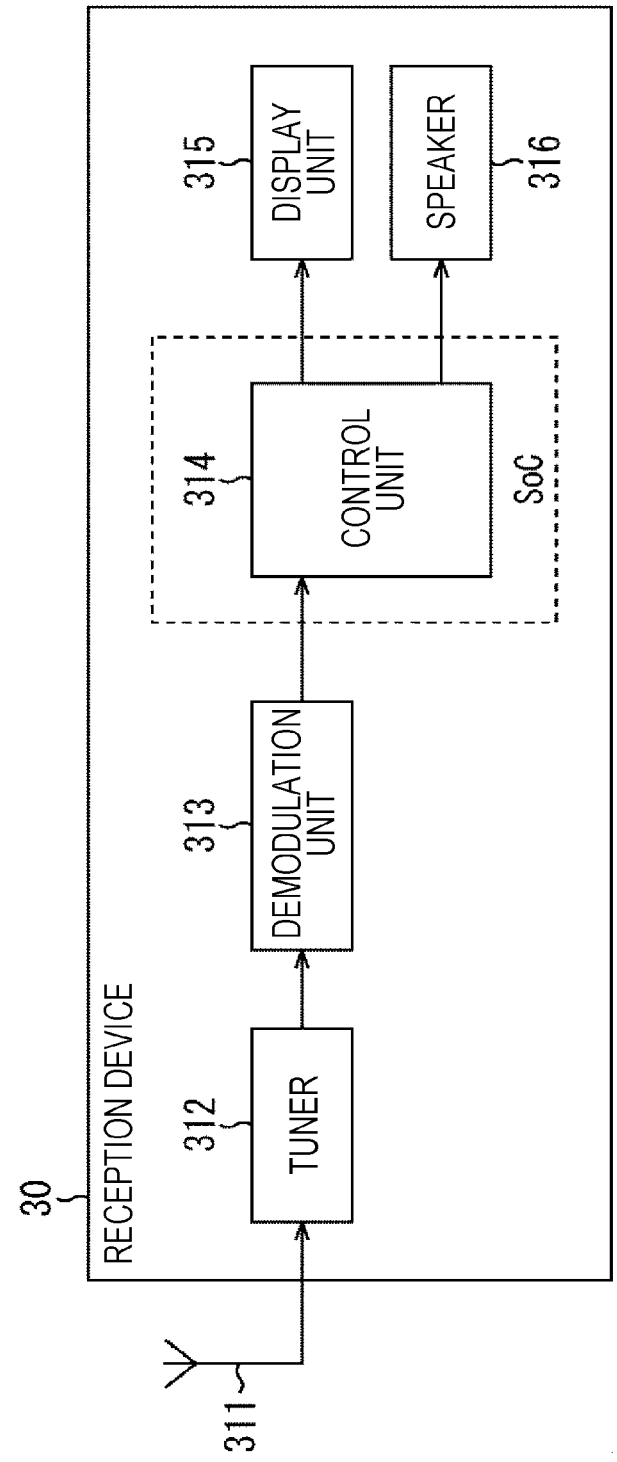
FIG. 19 is a diagram illustrating a configuration example of a reception device.

FIG. 19 is a diagram illustrating an example of the reception device 30 of FIG. 17.

In FIG. 19, the reception device 30 is composed of a tuner 312, a demodulation unit 313, a control unit 314, a display unit 315, and a speaker 316.

The tuner 312 executes synchronization on components of a predetermined frequency channel from a digital broadcast signal received from the antenna 311. The demodulation unit 313 executes a demodulation process of a digital broadcast signal which is synchronized by the tuner 312. Regarding the demodulation process, the demodulation process is executed on the transmission frame such as a T2 frame according to the DVB-T2 standard, which is received as a digital broadcast signal.

The control unit 314 executes a decoding process such as decoding on a signal from the demodulation unit 313 and displays a video of content such as a program obtained as the result on the display unit 315 and outputs sound from the speaker 316. Here, the control unit 314 is composed of a system on a chip (SoC).

Here, the demodulation unit 313 monitors emergency warning notification information included in the reserved bit of the P1 signaling or L1-pre signaling and determines whether or not the emergency warning notification information indicates that emergency warning information is being transmitted.

More specifically, when the above described L1-pre signaling transmission method (FIGS. 2 and 3) is employed, since a 1-bit emergency warning flag indicting that emergency warning information is being transmitted is allocated to the reserved bit of the L1-pre signaling, it is monitored whether the emergency warning flag is "1." Further, when the above described P1 signaling transmission method (FIG. 9 to 13) is employed, since a particular bit sequence indicating that emergency warning information is being transmitted is allocated to the reserved bits of the S1 field or S2 field of the P1 signaling, it is monitored whether the particular bit sequence is set.

When the emergency warning notification information indicates that the emergency warning information is being transmitted as a result of the emergency warning notification information monitoring by the demodulation unit 313, the control unit 314 acquires the emergency warning information to, for example, output the warning sound from the speaker 316 or displays a warning message on the display unit 315. With this, a warning alert can be instantly informed to the user.

Here, in the reception device 30, since the demodulation unit 313 monitors the emergency warning notification information, the control unit 314 as a system on a chip does not need to be activated. Then, when the emergency warning notification information indicates that the emergency warning information is being transmitted as a result of the emergency warning notification information monitoring result by the demodulation unit 313, the control unit 314 as a system on a chip is activated and acquires the emergency warning information.

Thus, when the L1-pre signaling transmission method (FIGS. 2 and 3) or the P1 signaling transmission method (FIG. 9 to 13) is employed, as explained with reference to FIGS. 4, 5, and 15, the process related to the emergency alert information can be executed more promptly at a low power consumption, compared to the DVB-EWS existing method (FIG. 1).

Further, since the emergency warning information is transmitted, for example, by any one of (A) method using SI information, (B) method using auxiliary stream, or (C) method using particular PLP, the receiver is to receive the emergency warning information transmitted by any one of the methods.

Here, regarding the reception device 30 of FIG. 19, a configuration in which the display unit 315 and speaker 316 are internally installed has been explained; however, the display unit 315 and speaker 316 may be externally provided.

<5. Process Flows in Each Device>

Figure 20:
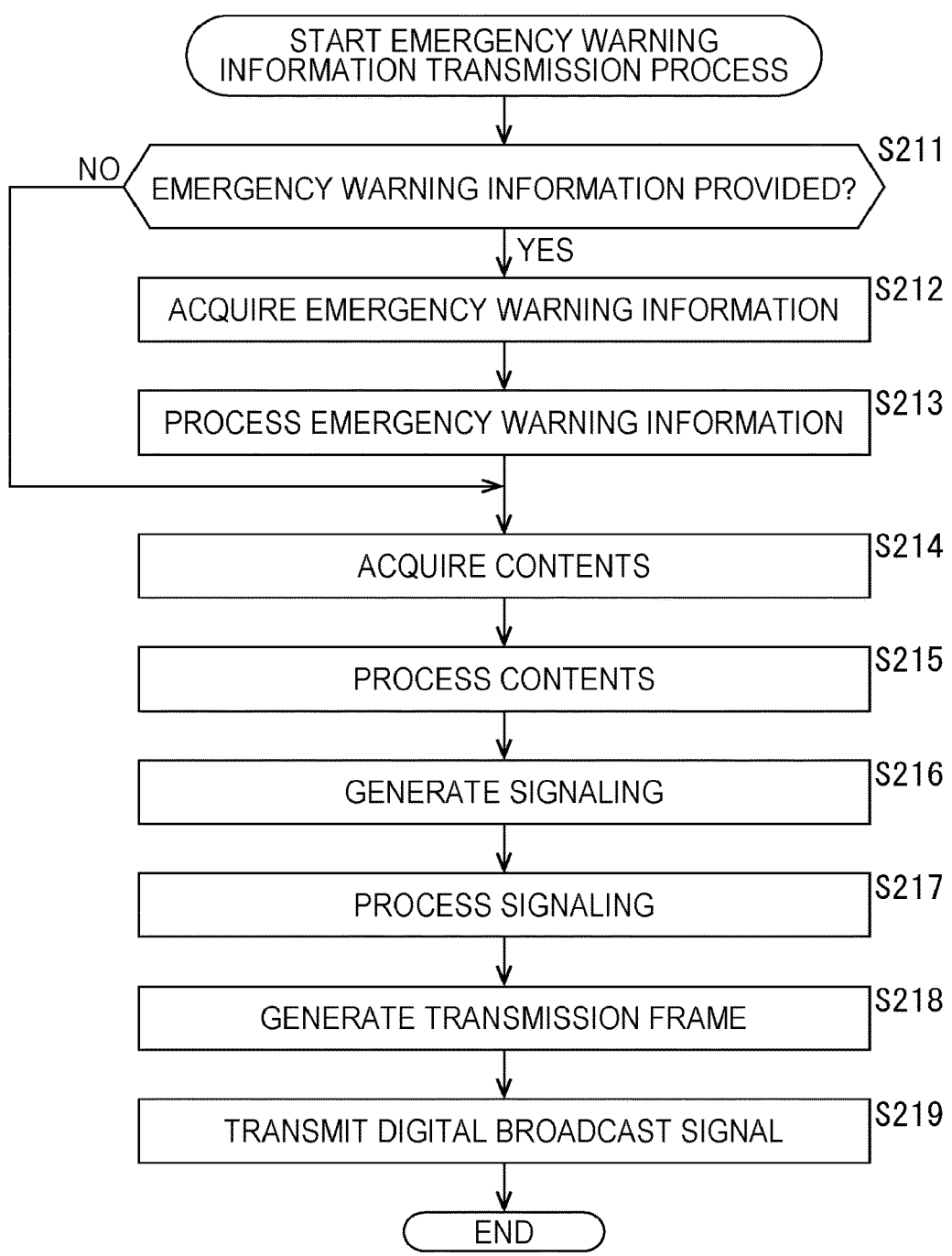
FIG. 20 is a flowchart to explain a flow of an emergency warning information transmission process.
Figure 21:
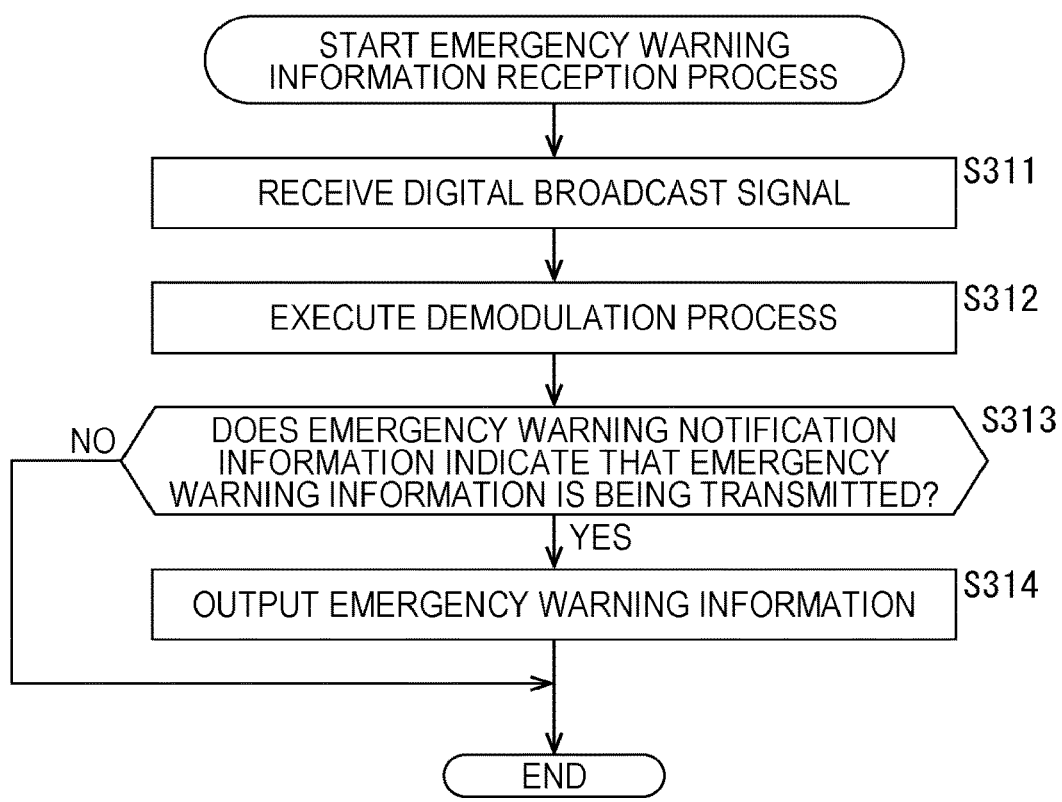
FIG. 21 is a flowchart to explain a flow of an emergency warning information reception process.

Next, with reference to a flowchart of FIGS. 20 and 21, a flow of process executed in each device composing the emergency warning information transmission system 1 of FIG. 17 will be explained.

(Emergency Warning Information Transmission Process)

Firstly, with reference to the flowchart of FIG. 20, a flow of an emergency warning information transmission process executed by the transmission device 20 of FIG. 17 will be explained.

In step S211, it is determined whether or not emergency warning information is provided from the information provision device 10 via any communication path. In step S211, when it is determined that the emergency warning information has been provided from the information provision device 10, the process proceeds to step S212.

In step S212, the emergency warning information provided from the information provision device 10 is acquired by the emergency warning information acquisition unit 211 and supplied to the emergency warning information processing unit 212. In step S213, the emergency warning information supplied from the emergency warning information acquisition unit 211 is processed by the emergency warning information processing unit 212 and supplied to the transmission frame generation unit 217.

When the process in step S213 is finished, the process proceeds to step S214. Here, in step S211, when it is determined that the emergency warning information is not provided from the information provision device 10, the processes in steps S212 and S213 are skipped and the process proceeds to step S214.

In step S214, contents such as a program are acquired by the content acquisition unit 213 and supplied to the content processing unit 214. In step S215, the contents supplied from the content acquisition unit 213 is processed by the content processing unit 214 and supplied to the transmission frame generation unit 217.

In step S216, signaling is generated by the signaling generation unit 215 and supplied to the signaling processing unit 216. In step S217, the signaling from the signaling generation unit 215 is processed by the signaling processing unit 216 and supplied to the transmission frame generation unit 217.

Here, in step S211, when it is determined that emergency warning information is provided from the information provision device 10 and the emergency warning information is acquired and processed (steps S212 and S213), emergency warning notification information indicating that the emergency warning information is being transmitted is included in P1 signaling or L1-pre signaling.

More specifically, when the above described L1-pre signaling transmission method (FIGS. 2 and 3) is employed, emergency warning flag allocated to the reserved bit of the L1-pre signaling is made to "1." Further, when the above described P1 signaling transmission method (FIG. 9 to 13) is employed, a particular bit sequence allocated to the reserved bits of the S1 field or S2 field of the P1 signaling is set.

In step S218, when the emergency warning information is provided from the information provision device 10 ("YES" in step S211), in the transmission frame generation unit 217, a transmission frame such as a T2 frame according to the DVB-T2 standard is generated on the basis of the emergency warning information from the emergency warning information processing unit 212, content data form the content processing unit 214, and signaling data from the signaling processing unit 216, and supplied to the broadcast signal transmission unit 218. Here, in this case, in the P1 signaling or L1-pre signaling, the emergency warning notification information indicating that the emergency warning information is being transmitted is included.

Here, when emergency warning information is not provided from the information provision device 10 ("NO" in step S211), a transmission frame such as a T2 frame according to the DVB-T2 standard is generated by the transmission frame generation unit 217 on the basis of the content data from the content processing unit 214 and signaling data from the signaling processing unit 216, and supplied to the broadcast signal transmission unit 218.

In step S219, the broadcast signal transmission unit 218 executes a predetermined process on the transmission frame from the transmission frame generation unit 217 and transmits the transmission frame as a digital broadcast signal via the antenna 219. When the process in step S219 is finished, the emergency warning information transmission process of FIG. 20 ends.

The emergency warning information transmission process has been explained. In the emergency warning information transmission process, when emergency warning information is provided from the information provision device 10, emergency warning notification information indicating that the emergency warning information is being transmitted is included in the P1 signaling or L1-pre signaling together with the emergency warning information and is transmitted using digital broadcast signals.

(Emergency Warning Information Reception Process)

Next, with reference to the flowchart of FIG. 21, a flow of an emergency warning information reception process executed by the reception device 30 of FIG. 17 will be explained. Here, it is assumed that the reception device 30 is in a sleep state at the start timing of the emergency warning information reception process.

In step S311, the tuner 312 synchronizes components of predetermined frequency channel with the digital broadcast signal received by the antenna 311. In other words, the reception device 30 receives the digital broadcast signal from the transmission device 20.

In step S312, the demodulation unit 313 executes a demodulation process of the digital broadcast signal synchronized by the tuner 312. In step S313, the demodulation unit 313 determines whether the emergency warning notification information included in the reserved bit of the P1 signaling or L1-pre signaling indicates that the emergency warning information is being transmitted on the basis of the result of the demodulation process in step S312.

More specifically, when the above described L1-pre signaling transmission method (FIGS. 2 and 3) is employed, the emergency warning flag allocated to the reserved bit of the L1-pre signaling is monitored and it is determined that the emergency warning notification information indicates that the emergency warning information is being transmitted when the emergency warning flag is "1." Further, when the above described P1 signaling transmission method (FIG. 9 to 13) is employed, the bit sequence set in the reserved bits of the S1 field or S2 field of the P1 signaling is monitored and it is determined that the emergency warning notification information indicates that the emergency warning information is being transmitted when the particular bit sequence is set.

In step S313, when it is determined that the emergency warning notification information indicates that the emergency warning information is being transmitted, the process proceeds to step S314. In step S314, the control unit 314 as the system on a chip is activated and the control unit 314 acquires and outputs the emergency warning information. For example, the control unit 314 controls to output a warning sound from the speaker 316 and displays a warning message on the display unit 315 on the basis of the emergency warning information. With this, a warning alert can be instantly informed to the user.

Here, in step S313, when it is determined that the emergency warning notification information does not indicate that the emergency warning information is being transmitted, the process of step S314 is skipped. When the process of step S314 is finished or skipped, the emergency warning information reception process of FIG. 21 ends.

In the above, the emergency warning information reception process has been explained. In the emergency warning information reception process, when the emergency warning information is transmitted from the transmission device 20, since the emergency warning notification information included in the reserved bit of the P1 signaling or L1-pre signaling indicates that the emergency warning information is being transmitted, the emergency warning information is acquired and output according to the result of monitoring the emergency warning notification information.

<6. Computer Configuration>

Figure 22:
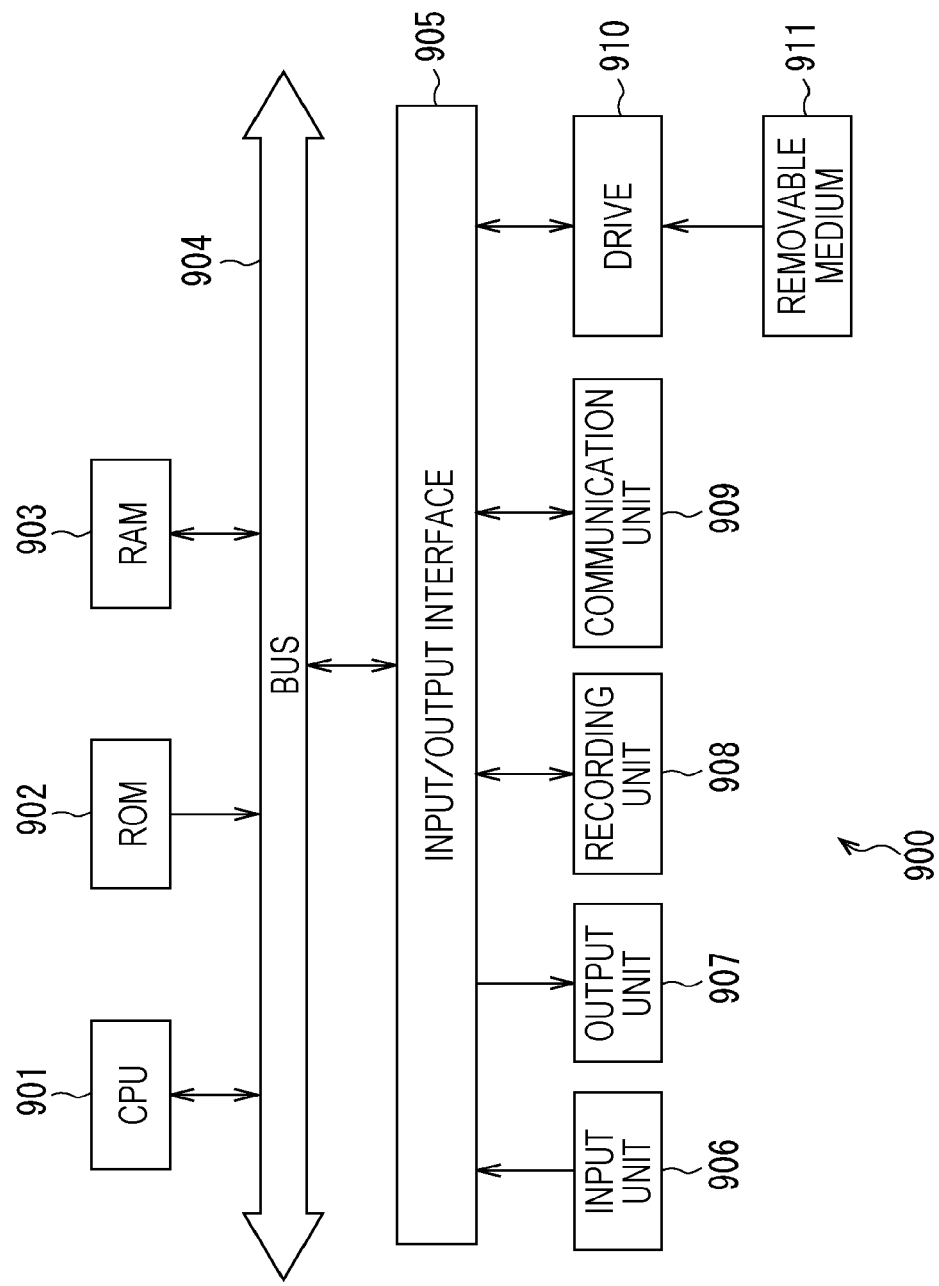
FIG. 22 is a diagram illustrating a configuration example of a computer.

The above described series of processes may be executed by hardware or may be executed by software. When the series of processes are executed by software, a program that composes the software is installed in the computer. FIG. 22 is a diagram illustrating a configuration example of hardware of the computer that executes the above described series of processes with a program.

In the computer 900, a central processing unit (CPU) 901, a read only memory (ROM) 902, and a random access memory (RAM) 903 are connected to one another by a bus 904. To the bus 904, an input/output interface 905 is further connected. To the input/output interface 905, an input unit 906, an output unit 907, a recording unit 908, a communication unit 909, and a drive 910 are connected.

The input unit 906 is composed of a keyboard, a mouse, a microphone, or the like. The output unit 907 is composed of a display, a speaker, or the like. The recording unit 908 is composed of hard disk, a non-volatile memory, or the like. The communication unit 909 is composed of a network interface or the like. The drive 910 drives a removable medium 911 such as a magnetic disk, an optical disk, a magnetic optical disk, a semiconductor memory, and the like.

In the computer 900 composed as described above, a program stored in the ROM 902 or recording unit 908 is loaded in the RAM 903 by the CPU 901, via the input/output interface 905 and bus 904, and executed so that the above described series of processes are executed.

The program that the computer 900 (CPU 901) executes can be recorded and provided in the removable medium 911 such as a packaged medium for example. Further, the program can be provided via a wired or wireless transmission medium such as a local area network, the Internet, digital satellite broadcasting, or the like.

In the computer 900, the program can be installed to the recording unit 908 by attaching the removable medium 911 to the drive 910 via the input/output interface 905. Further, the program can be received by the communication unit 909 via a wired or wireless transmission medium and installed to the recording unit 908. Other programs can be stored in the ROM 902 or recording unit 908 in advance.

Here, according to this specification, the process that the computer executes according to the program does not always have to be executed in chronological order according to the order described in the flowchart. In other words, the process that the computer executes according to the program includes processes that are executed in parallel or individually (for example, parallel processing or a process by an object). Further, the program may be processed by a single computer (processor) or may be processed by a plurality of computers in a distributed manner.

Here, the embodiments of the present technology are not limited to the above described embodiments and various changes may be applied within the scope of the present technology.

Further, the present technology may have the following configuration.

(1)

A transmission device including:

an emergency warning information acquisition unit configured to acquire emergency warning information;

a content acquisition unit configured to acquire a content;

a transmission frame generation unit configured to generate a transmission frame that includes emergency warning notification information indicating that the emergency warning information is being transmitted in P1 signaling or L1-pre signaling, as a transmission frame, according to the digital video broadcasting-terrestrial 2 (DVB-T2) standard, composed of a first preamble signal of the P1 signaling, a second preamble signal of the L1-pre signaling, and the content data; and a transmission unit configured to transmit the transmission frame as a digital broadcast signal.

(2)

The transmission device according to (1), wherein, when included in the L1-pre signaling, the emergency warning notification information is placed in a reserved bit of the L1-pre signaling.

(3)

The transmission device according to (2),
wherein
the emergency warning notification information is a 1-bit emergency warning flag, and
the emergency warning information is transmitted using service information (SI) information, an auxiliary stream, or a particular physical layer pipe (PLP) which are defined in the DVB-T2 standard.

(4)

The transmission device according to (1), wherein, when included in the P1 signaling, the emergency warning notification information is placed in a reserved bit of the P1 signaling.

(5)

The transmission device according to (4),
wherein
the emergency warning notification information is a particular bit sequence, and
the emergency warning information is transmitted using SI information, an auxiliary stream, or a particular PLP which are defined in the DVB-T2 standard.

(6)

The transmission device according to any of (1) to (5), further including a signaling generation unit configured to generate the P1 signaling and the L1-pre signaling.

(7)

A transmission method of a transmission device,
the transmission device executing steps of:
acquiring emergency warning information;
acquiring content;
generating a transmission frame that includes emergency warning notification information indicating that the emergency warning information is being transmitted in P1 signaling or L1-pre signaling as a transmission frame, according to the DVB-T2 standard, composed of a first preamble signal including the P1 signaling, a second preamble signal including the L1-pre signaling, and content data; and
transmitting the transmission frame as a digital broadcast signal.

(8)

A reception device including:
a reception unit configured to receive, as a digital broadcast signal, a transmission frame, according to DVB-T2 standard, composed of a first preamble signal including P1 signaling, a second preamble signal including L1-pre signaling, and content data; and
a demodulation unit configured to demodulate the first preamble signal, or the first preamble signal and the second preamble signal and monitor emergency warning notification information indicating that emergency warning information is being transmitted in the P1 signaling included in the first preamble signal or the L1-pre signaling included in the second preamble signal.

(9)

The reception device according to (8), wherein when including in the L1-pre signaling, the emergency warning notification information is placed in a reserved bit of the L1-pre signaling.

(10)

The reception device according to (9),
wherein
the emergency warning notification information is a 1-bit emergency warning flag, and
the emergency warning information is transmitted using SI information, an auxiliary stream, or a particular PLP which are defined by the DVB-T2 standard,
further including
a control unit configured to be activated when the emergency warning notification information indicates that the emergency warning information is being transmitted, and acquire the emergency warning information transmitted using the SI information, the auxiliary stream, or the particular PLP.

(11)

The reception device according to (8), wherein, when included in the P1 signaling, the emergency warning notification information is placed in a reserved bit of the P1 signaling.

(12)

The reception device according to (11), wherein
the emergency warning notification information is a particular bit sequence, and
the emergency warning information is transmitted using SI information, an auxiliary stream, or a particular PLP, which are defined in the DVB-T2 standard,
further including
a control unit configured to be activated when the emergency warning notification information indicates that the emergency warning information is being transmitted, and acquire the emergency warning information transmitted using the SI information, the auxiliary stream, or the particular PLP.

(13)

A reception method of a reception device,
the reception device executing steps of:
receiving, as a digital broadcast signal, a transmission frame, according to DVB-T2 standard, composed of a first preamble signal including P1 signaling, a second preamble signal including L1-pre signaling, and content data; and
demodulating the first preamble signal, or the first preamble signal and the second preamble signal, and monitoring emergency warning notification information indicating that emergency warning information is being transmitted in the P1 signaling included in the first preamble signal or the L1-pre signaling included in the second preamble signal.

REFERENCE SIGNS LIST

1 Emergency warning information transmission system
10 Information provision device
20 Transmission device
30 Reception device
211 Emergency warning information acquisition unit
212 Emergency warning information processing unit
213 Content acquisition unit
214 Content processing unit
215 Signaling generation unit
216 Signaling processing unit
217 Transmission frame generation unit
218 Broadcast signal transmission unit 312 Tuner
313 Demodulation unit
314 Control unit
315 Display unit
316 Speaker
900 Computer
901 CPU

The invention claimed is:

1. A transmission device comprising:
circuitry configured to
acquire emergency warning information;
acquire a content;
generate a transmission frame that includes emergency warning notification information indicating that the emergency warning information is being transmitted in P1 signaling or L1-pre signaling, as a transmission frame, according to the digital video broadcasting-terrestrial 2 (DVB-T2) standard, composed of a first preamble signal of the P1 signaling, a second preamble signal of the L1-pre signaling, and the content; and
transmit the transmission frame as a digital broadcast signal.

2. The transmission device according to claim 1, wherein, the emergency warning notification information is included in the L1-pre signaling and the emergency warning notification information is placed in a reserved bit of the L1-pre signaling.

3. The transmission device according to claim 2, wherein the emergency warning notification information is a 1-bit emergency warning flag, and
the emergency warning information is transmitted using service information (SI) information, an auxiliary stream, or a particular physical layer pipe (PLP) which are defined in the DVB-T2 standard.

4. The transmission device according to claim 1, wherein, the emergency warning notification information is included in the P1 signaling and the emergency warning notification information is placed in a reserved bit of the P1 signaling.

5. The transmission device according to claim 4, wherein the emergency warning notification information is a particular bit sequence, and
the emergency warning information is transmitted using SI information, an auxiliary stream, or a particular PLP which are defined in the DVB-T2 standard.

6. The transmission device according to claim 1, wherein the circuitry is further configured to generate the P1 signaling or the L1-pre signaling.

7. A transmission method of a transmission device, the transmission device executing the method comprising:
acquiring emergency warning information;
acquiring content;
generating a transmission frame that includes emergency warning notification information indicating that the emergency warning information is being transmitted in P1 signaling or L1-pre signaling as a transmission frame, according to the DVB-T2 standard, composed of a first preamble signal including the P1 signaling, a second preamble signal including the L1-pre signaling, and the content; and
transmitting the transmission frame as a digital broadcast signal.

8. A reception device comprising:
circuitry configured to
receive, as a digital broadcast signal, a transmission frame, according to DVB-T2 standard, composed of a first preamble signal including P1 signaling, a second preamble signal including L1-pre signaling, and content data; and
demodulate the first preamble signal, or the first preamble signal and the second preamble signal and monitor emergency warning notification information indicating that emergency warning information is being transmitted in the P1 signaling included in the first preamble signal or the L1-pre signaling included in the second preamble signal.

9. The reception device according to claim 8, wherein the emergency warning notification information is placed in a reserved bit of the L1-pre signaling.

10. The reception device according to claim 9, wherein
the emergency warning notification information is a 1-bit emergency warning flag,
the emergency warning information is transmitted using SI information, an auxiliary stream, or a particular PLP which are defined by the DVB-T2 standard, and
the circuitry is further configured to be activated when the emergency warning notification information indicates that the emergency warning information is being transmitted, and acquire the emergency warning information transmitted using the SI information, the auxiliary stream, or the particular PLP.

11. The reception device according to claim 8, wherein the emergency warning notification information is placed in a reserved bit of the P1 signaling.

12. The reception device according to claim 11, wherein
the emergency warning notification information is a particular bit sequence,
the emergency warning information is transmitted using SI information, an auxiliary stream, or a particular PLP, which are defined in the DVB-T2 standard, and
the circuitry is further configured to be activated when the emergency warning notification information indicates that the emergency warning information is being transmitted, and acquire the emergency warning information transmitted using the SI information, the auxiliary stream, or the particular PLP.

13. A reception method of a reception device, the reception device executing the method comprising:
receiving, as a digital broadcast signal, a transmission frame, according to DVB-T2 standard, composed of a first preamble signal including P1 signaling, a second preamble signal including L1-pre signaling, and content data; and
demodulating the first preamble signal, or the first preamble signal and the second preamble signal, and monitoring emergency warning notification information indicating that emergency warning information is being transmitted in the P1 signaling included in the first preamble signal or the L1-pre signaling included in the second preamble signal.

* * * * *